US012756691B2

(12) United States Patent
Nair

(10) Patent No.: US 12,756,691 B2
(45) Date of Patent: Oct. 6, 2026

(54) SECURE SYSTEM AND METHOD FOR SHARING ONLINE ACCOUNTS

(71) Applicant: Multifactor, Inc., Newark, DE (US)

(72) Inventor: Vivek Chinar Nair, Santa Clara, CA (US)

(73) Assignee: Multifactor, Inc., Newark, DE (US)

( * ) Notice: Subject to any disclaimer, the term of this patent is extended or adjusted under 35 U.S.C. 154(b) by 387 days.

(21) Appl. No.: 18/165,365

(22) Filed: Feb. 7, 2023

(65) Prior Publication Data

US 2023/0254288 A1 Aug. 10, 2023

Related U.S. Application Data

(60) Provisional application No. 63/267,612, filed on Feb. 7, 2022.

(51) Int. Cl.
*G06F 7/04* (2006.01)
*H04L 9/40* (2022.01)

(52) U.S. Cl.
CPC ........ *H04L 63/0281* (2013.01); *H04L 63/083* (2013.01)

(58) Field of Classification Search
CPC . H04L 63/0281; H04L 63/083; H04L 9/3247; H04L 9/3255; H04L 63/0884; G06F 21/44
See application file for complete search history.

(56) References Cited

U.S. PATENT DOCUMENTS

2013/0132584 A1* 5/2013 Palladino ................ G06F 9/541 709/226
2013/0174234 A1* 7/2013 Yang ..................... H04L 63/083 726/6
2014/0280012 A1* 9/2014 Feuerlein ............. G06F 16/986 707/709
2015/0134956 A1* 5/2015 Stachura ............. H04L 63/0815 713/168
2015/0135302 A1* 5/2015 Cohen ................... G06F 21/128 726/12
2016/0014125 A1* 1/2016 Klein ...................... H04L 61/59 709/224
2017/0012941 A1* 1/2017 Subbarayan ............ H04L 67/10
2018/0115523 A1* 4/2018 Subbarayan ........... G06N 20/00
2018/0145965 A1* 5/2018 Pranam ................. H04L 63/083
2019/0268311 A1* 8/2019 Mihai ................... H04L 63/168
2020/0220875 A1* 7/2020 Harguindeguy ...... H04L 63/101
2021/0014073 A1* 1/2021 Currie ................... H04L 9/3236
2022/0255934 A1* 8/2022 Henry ................. H04L 63/0884
(Continued)

OTHER PUBLICATIONS

Schiffman et al., DAuth: Fine-Grained Authorization Delegation for Distributed Web Application Consumers, Jul. 23, 2010, IEEE, pp. 95-102. (Year: 2010).*
(Continued)

*Primary Examiner* — Philip J Chea
*Assistant Examiner* — Jenise E Jackson
(74) *Attorney, Agent, or Firm* — Robinson IP Law, PLLC

(57) ABSTRACT

A secure system and method for sharing online accounts includes: a web service; a shared account residing on the web service; a client device requiring access to the shared account; and a proxy server; whereby the client device makes requests to the web service through the proxy server to access the shared account.

3 Claims, 35 Drawing Sheets

(56) References Cited

U.S. PATENT DOCUMENTS

| | | | | |
|---|---|---|---|---|
| 2022/0329655 | A1* | 10/2022 | Vallapureddy | G06F 21/6236 |
| 2022/0366030 | A1* | 11/2022 | Gao | G06F 21/72 |
| 2023/0119385 | A1* | 4/2023 | Fenichel | H04L 63/0876<br>726/6 |
| 2023/0216681 | A1* | 7/2023 | Azaria | H04L 9/3213<br>726/9 |

OTHER PUBLICATIONS

Wu et al, Design and Implementation of Cloud API Access Control Based on OAuth, Apr. 19, 2013, IEEE, pp. 485-489. (Year: 2013).*

* cited by examiner

SECURE SYSTEM AND METHOD FOR SHARING ONLINE ACCOUNTS

CROSS-REFERENCE TO RELATED APPLICATION

This application claims priority to and is a non-provisional of U.S. Provisional Patent Application Ser. No. 63/267,612 for a Secure System and Method for Sharing Online Accounts filed on Feb. 7, 2022, the contents of which are incorporated herein by reference in its entirety.

FIELD

This disclosure relates to the field of information security. More particularly, this disclosure relates to systems and methods for sharing online accounts.

BACKGROUND

A web service 240 having one or more online accounts may contain a number of resources that an organization wishes to share across multiple users 110. While some web services 240 may contain built-in mechanisms for sharing online account resources (such as a document sharing service allowing a file to be edited by multiple accounts), many services have no such mechanism yet still may need to be shared for practical reasons (such as an entire accounting department needing access to a bank website having only one online account for a given bank account). In such situations, direct credential sharing is typically used, as shown in FIG. 1. In a first step, a user 110 establishes an online account with a web service 240 using a credential. In a second step, a user 110 shares the credential with other users 110 requiring access to the same online account, for example via email or by using a password management tool. The other users 110 can then use the shared credential to access the shared account 241 through their own client device 220.

FIG. 2 illustrates the lack of fine-grained permissioning when using direct credential sharing. A user 110 who receives a credential for an online account gains the capability to utilize all the permissions and functionalities associated with that account. For instance, a user 110 receiving a credential for an online bank account may gain access to both the "view balance" and the "send transfer" functionalities. The lack of fine-grained permissioning when using direct credential sharing has the consequence of making it impossible to delegate some functionalities of an online account while withholding others, instead forcing an "all or nothing" delegation.

FIG. 3 illustrates an authorized user 110 sharing a credential with an unauthorized user 110 when using direct credential sharing. An additional consequence of the direct credential sharing method for sharing online accounts is the lack of a mechanism for preventing a user 110 who has received an account credential from sharing the same credential with another user 110, including a user 110 who is not duly authorized to access the shared account 241. Furthermore, after an account credential is shared with a number of users 110, for example via email, it may be difficult or impossible to even detect whether the credential has later been further shared with unauthorized users 110.

FIG. 4 illustrates a user 110 changing an account credential when using direct credential sharing. A further consequence of the lack of fine-grained permissioning when using direct credential sharing is the potential ability of a user 110 receiving the credential for a shared account 241 to access the administrative or settings pages of the account, whereby the credentials of the account can be changed. In doing so, the user 110 may have the ability to hijack the shared account 241 and deny access to other users 110 who are legitimately entitled to access the account.

FIG. 5 illustrates the lack of revocability when using direct credential sharing. Suppose a user 110 who was originally entitled to access a shared account 240 is no longer deserving of that privilege, for example because they left the team responsible for managing said account. However, when using the direct credential sharing method for sharing online accounts, revoking access to an account after it has been granted is difficult, as the user 110 can retain access to the account by remembering the account credential that was shared with them. While the account credential can be changed, this requires the new credential to be sent again to all users 110 who remain entitled to access the account. Furthermore, if a user 110 is already logged in to the shared account, changing the account credential may not necessarily log them out of said account, and thus revocations may not be immediately effective.

FIG. 6 illustrates the lack of nonrepudiation when using direct credential sharing. If the credential of an online account is shared with multiple users 110, one of whom later takes an unauthorized action on said account, it is difficult to trace which of the several users 110 took said unauthorized action. Further, any user 110 accused of taking an unauthorized action can plausibly claim that said action was actually taken by one of the other users 110 knowing the account credential, thereby repudiating the action.

While organizations have a legitimate need to share online accounts even when a web service 240 does not provide native sharing features, the direct credential sharing method for sharing online accounts lacks a number of important security features such as fine-grained permissioning, revocability, and nonrepudiation. What is needed, therefore, is a secure system and method for sharing online accounts.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a secure system and method for sharing online accounts described herein may be implemented using various components such as one or more computers, computer readable storage mediums, and computer networks for storing and transmitting data as described in greater detail below. The system and method for multi-factor key derivation is operable across multiple components using network connectivity, servers, databases, and devices such as smartphones or personal computers to receive and transmit data between components.

Figure 1:
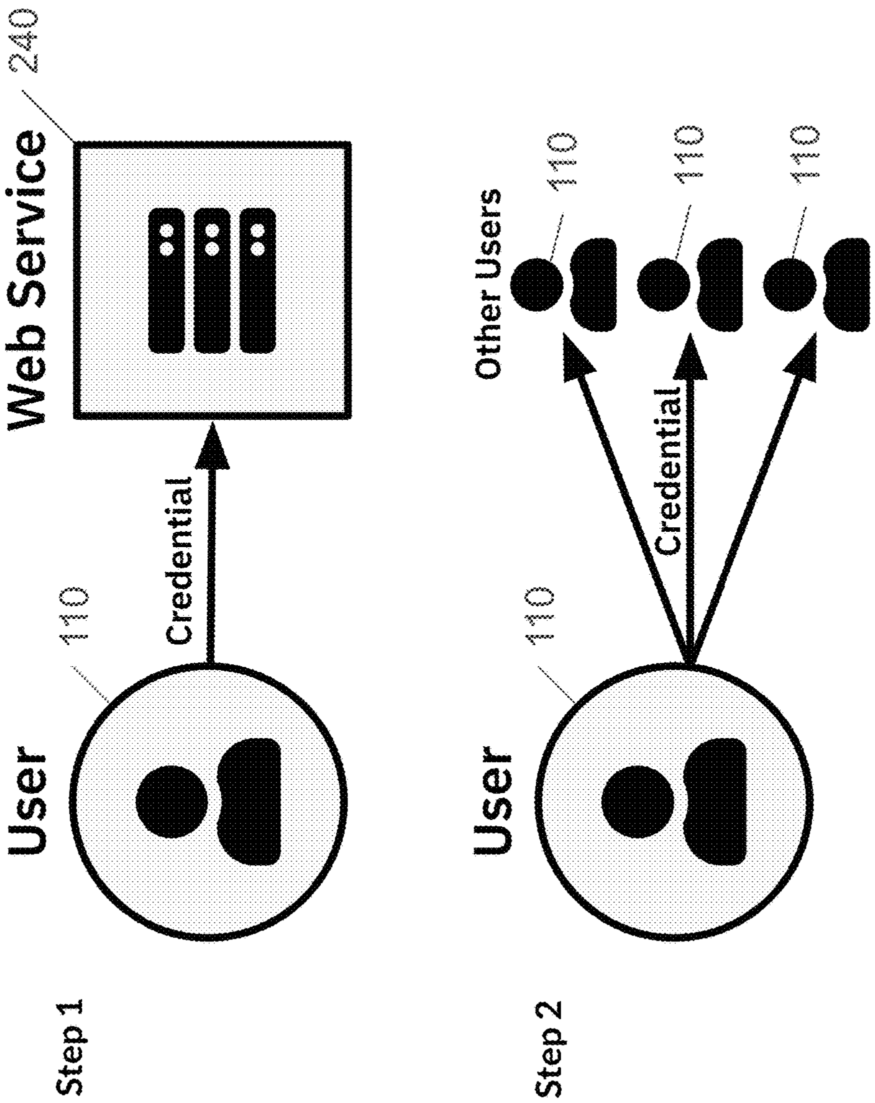
FIG. 1 (Prior Art)
FIG. 1 shows a process of sharing online accounts using direct credential sharing according to one embodiment of the present disclosure.
Figure 2:
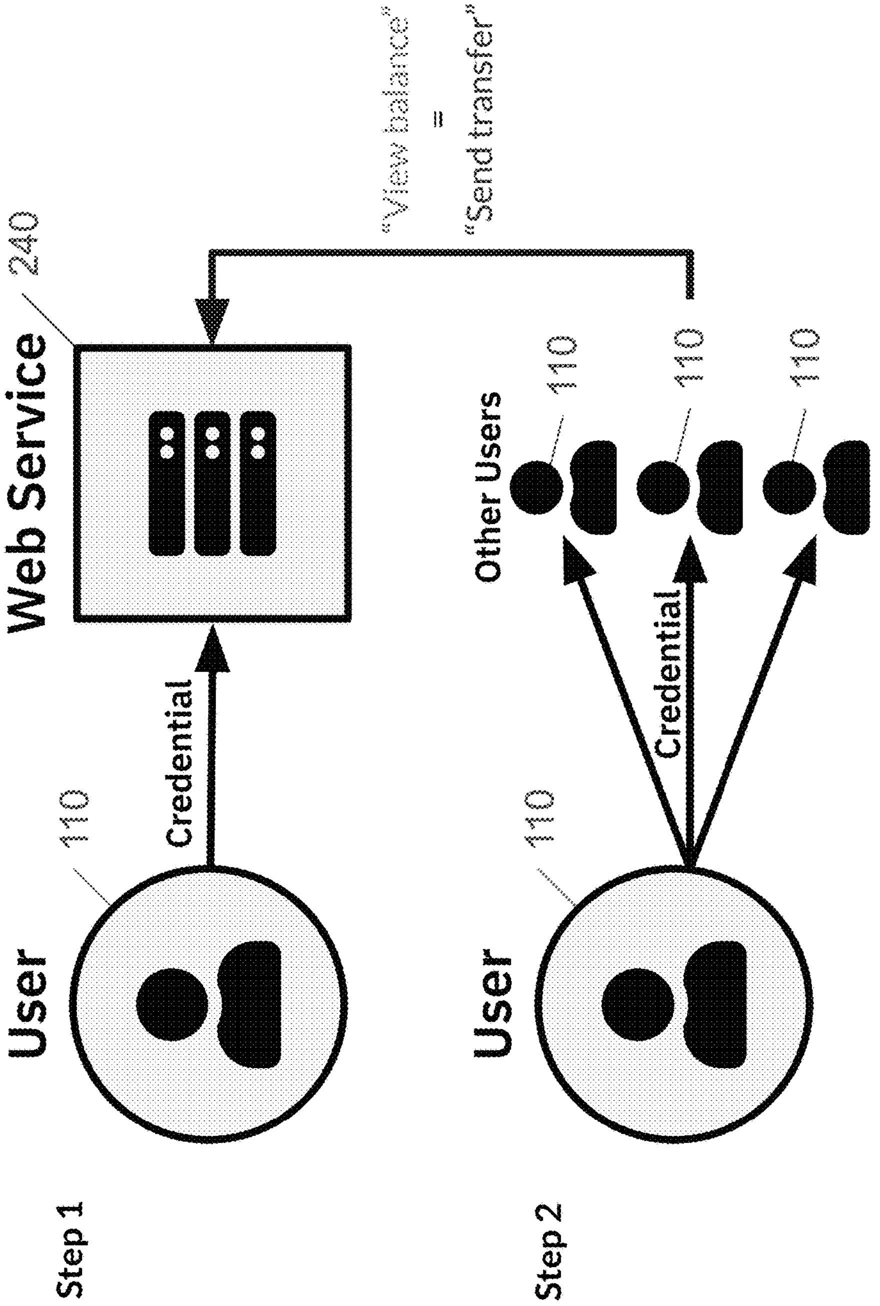
FIG. 2 (Prior Art)
FIG. 2 shows a user demonstrating the lack of fine-grained permissioning when using direct credential sharing according to one embodiment of the present disclosure.
Figure 3:
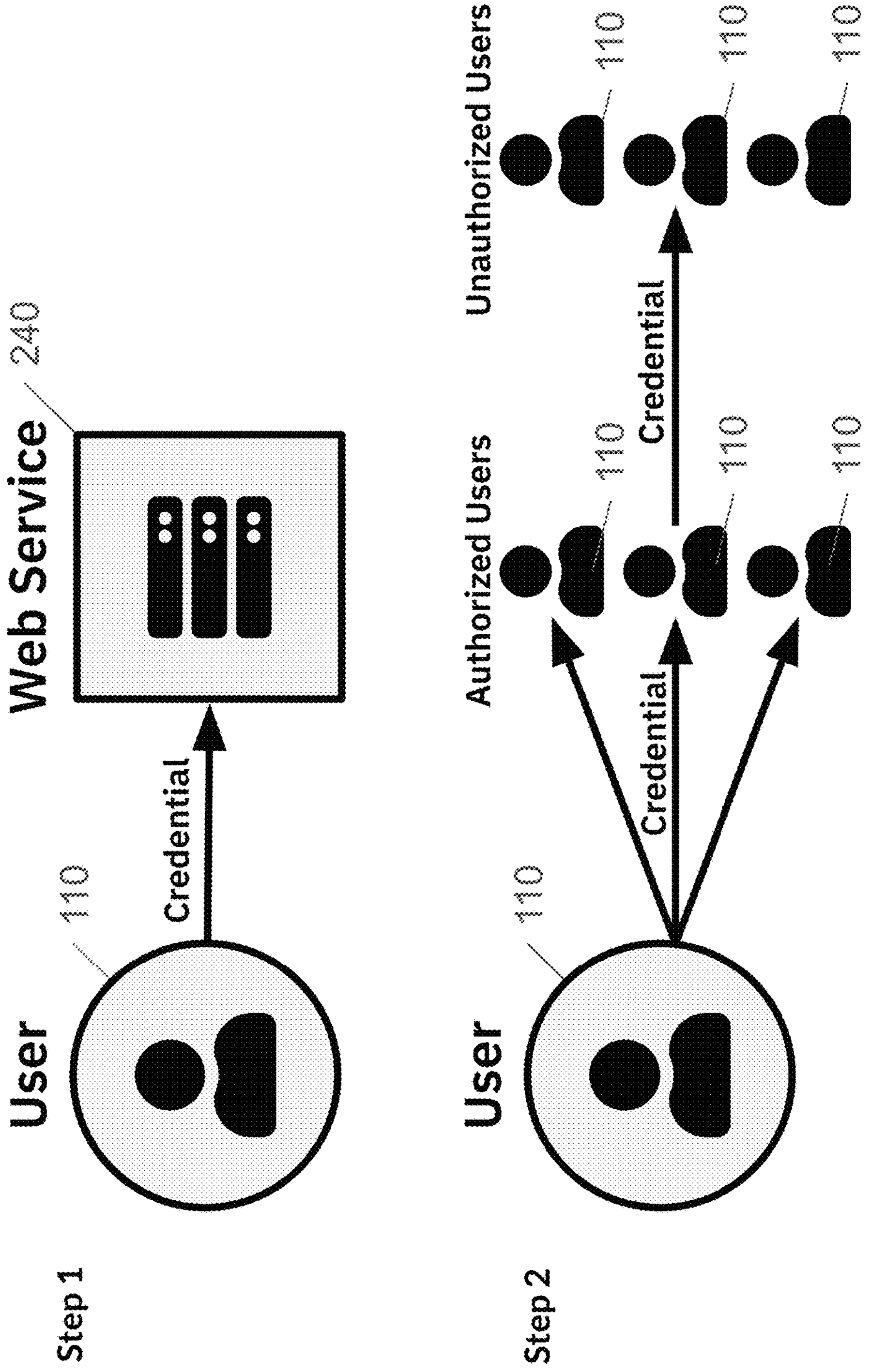
FIG. 3 (Prior Art)
FIG. 3 shows a process of an authorized user sharing a credential with an unauthorized user when using direct credential sharing according to one embodiment of the present disclosure.
Figure 4:
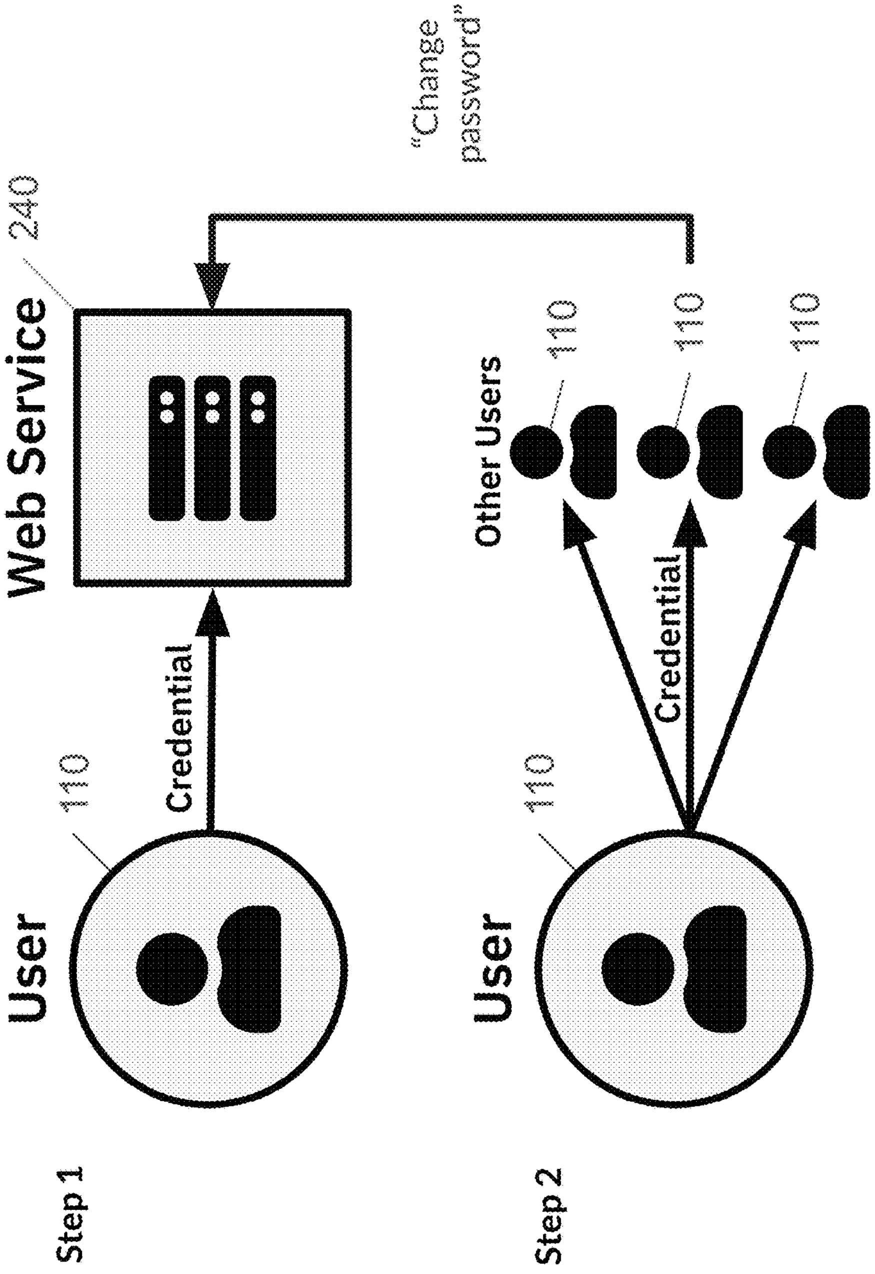
FIG. 4 (Prior Art)
FIG. 4 shows a process of a user changing an account credential when using direct credential sharing according to one embodiment of the present disclosure.
Figure 5:
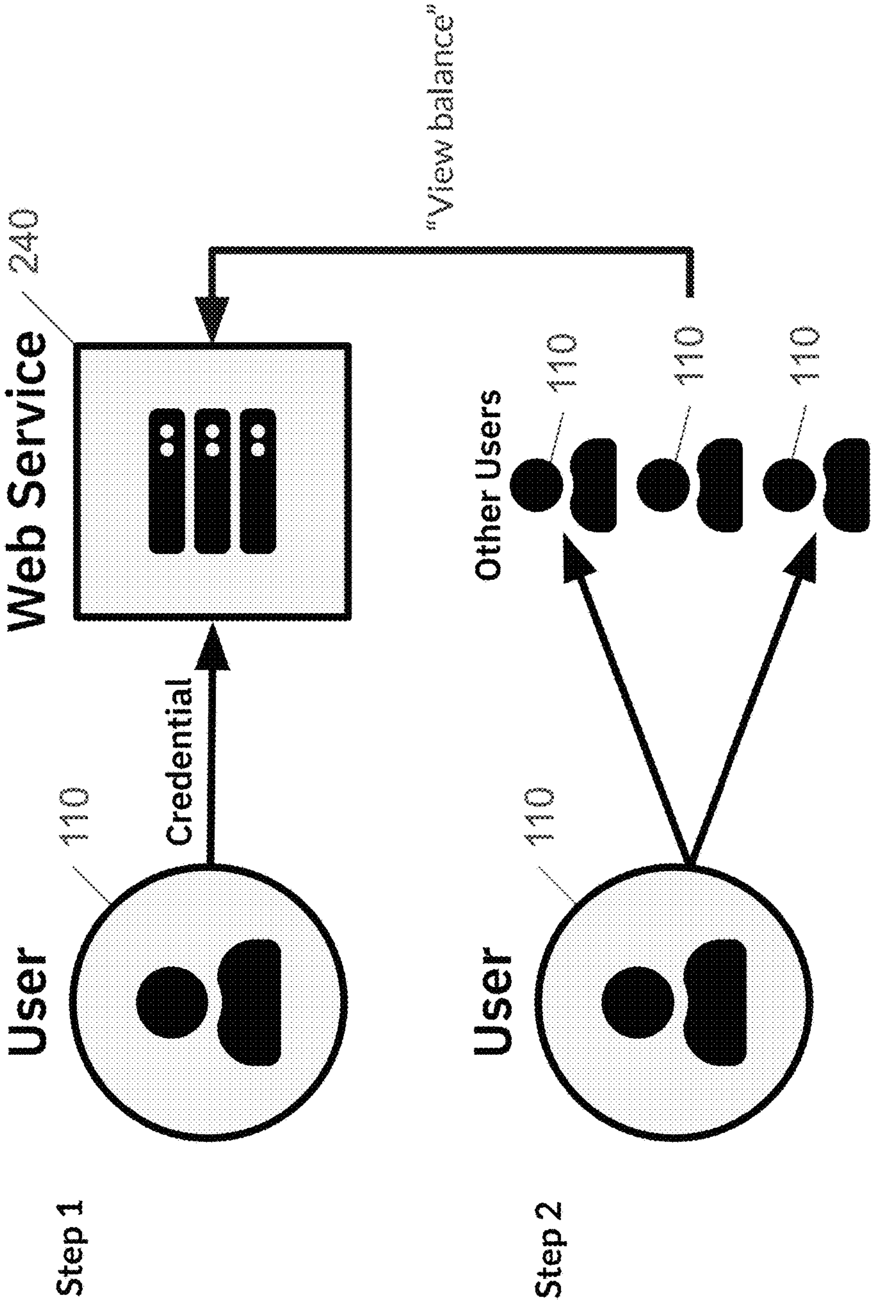
FIG. 5 (Prior Art)
FIG. 5 shows a user demonstrating the lack of revocability when using direct credential sharing according to one embodiment of the present disclosure.
Figure 6:
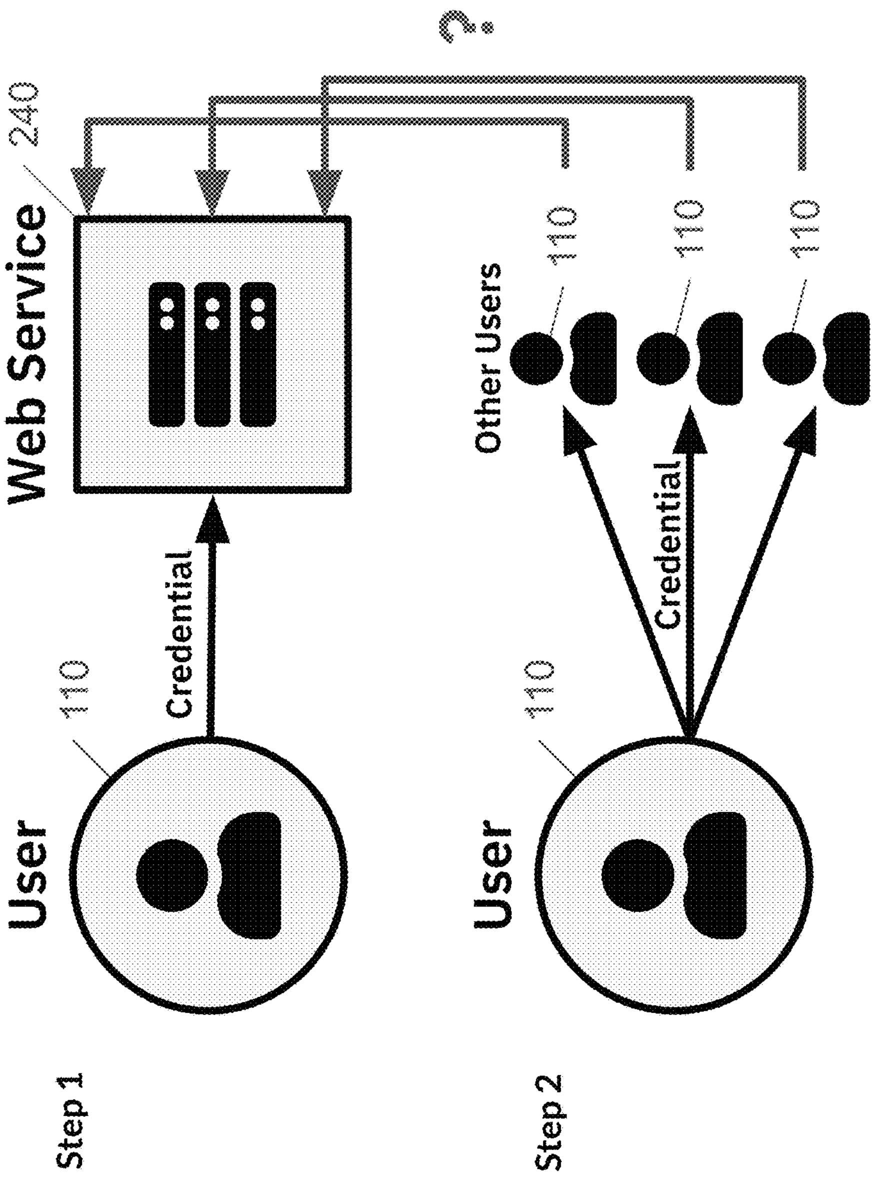
FIG. 6 (Prior Art)
FIG. 6 shows a user demonstrating repudiability when using direct credential sharing according to one embodiment of the present disclosure.
Figure 7:
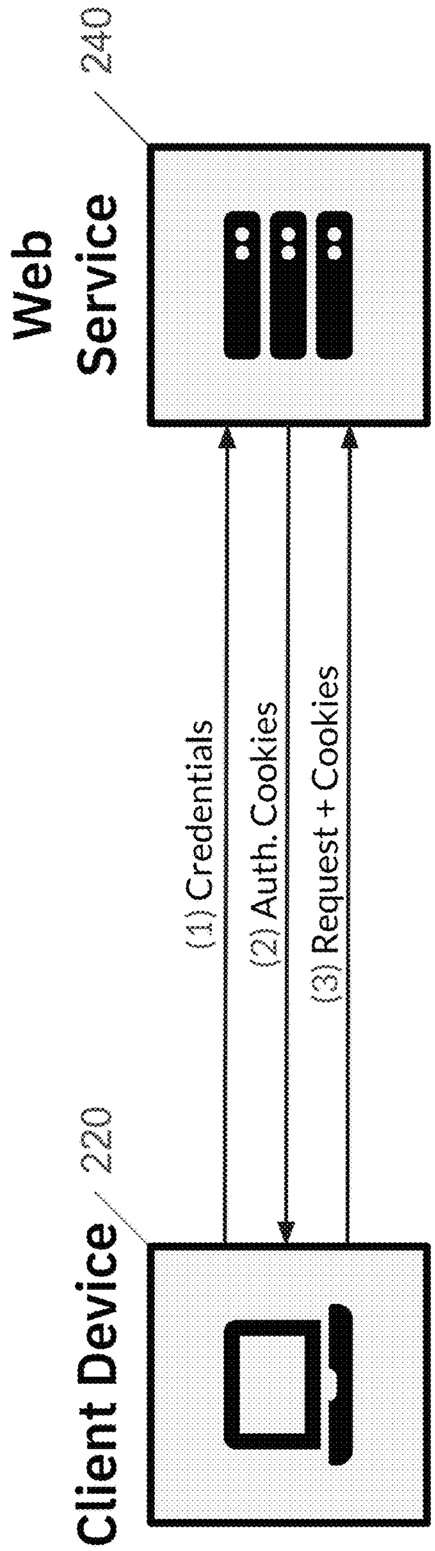
FIG. 7 (Prior Art)
FIG. 7 shows a process of a client device authenticating with a web service according to one embodiment of the present disclosure.
Figure 8:
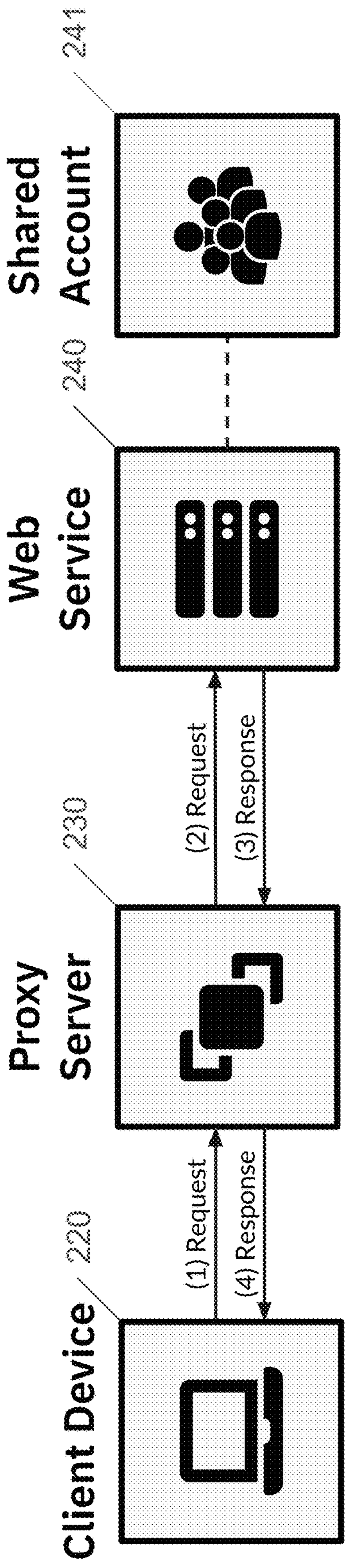
FIG. 8 shows a process of sharing online accounts using a secure system and method for sharing online accounts according to one embodiment of the present disclosure.

FIG. 8 shows a basic embodiment of a system and method for multi-factor key derivation consisting of a web service 240, a shared account 241 residing on the web service 240, a client device 220 requiring access to the shared account 241, and a proxy server 230, whereby the client device 220 makes requests to the web service 240 through the proxy server 230 to access the shared account 240. In a first step, the client device 220 requiring access to the shared account 241 sends a web request to the proxy server 230. In a second step, the proxy server 230 forwards the web request to the web service 240 hosting the shared account 241. In a third step, the web service 240 processes the web request and delivers a response to the proxy server 230. In a fourth step, the proxy server 230 forwards the response to the client device 220. Through this process, the client device 220 is able to access the web service 240 hosting the shared account 241 without ever directly interacting with the web service 240. However, the web service 240 does not necessarily require explicit support for this process, nor is the web service 240 necessarily aware that they are interacting with the proxy server 230 rather than directly with a client device 220. Instead, the network requests between the proxy server 230 and web service 240 follow the standard protocol expected by the web service 240 as though it were being accessed directly with the client device 220.

Figure 9:
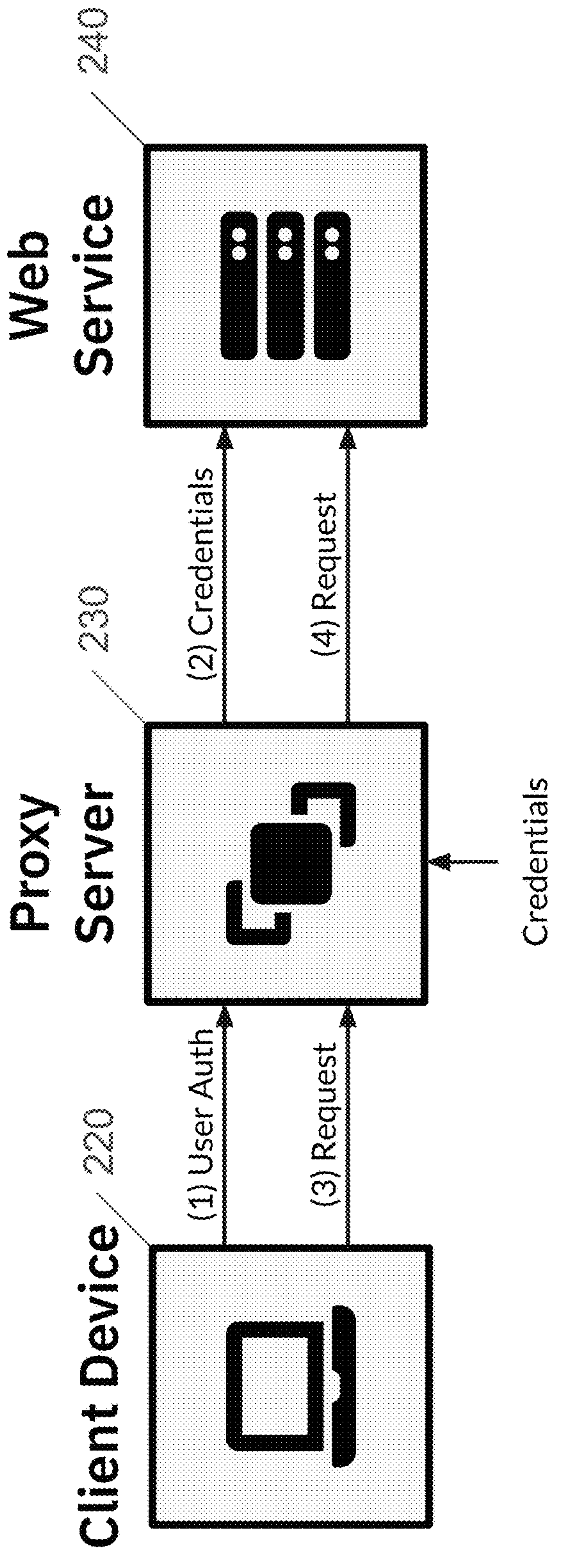
FIG. 9 shows a process of sharing online accounts using a secure system and method for sharing online accounts wherein the proxy server is further configured to store credentials associated with the shared account according to one embodiment of the present disclosure.

In one embodiment, shown in FIG. 9, the proxy server 230 is further configured to store credentials associated with the shared account 241. In a first step, a client device 220 authenticates with a proxy server 230 using an authentication protocol. In a second step, the proxy server 230 authenticates with a web service 240 hosting the shared account 241 using the stored credentials. At this stage, the web service may return an authentication token (not shown), which can be stored either on the proxy server 230 or on the client device 220. In a third step, the client device 220 sends a web request to the proxy server 230. In a fourth step, the proxy server 230 forwards the web request to the web service 240. Having previously authenticated with the web service 240 using the stored credentials, either the client device 220 or the proxy server 230 may attach an authentication token to their message, thereby authenticating the request. Therefore, the client device 220 is able to make authenticated requests to the web service 240 via the proxy server 230 without having direct knowledge of the credentials associated with the shared account 241, thereby eliminating the threat of an authorized user 110 sharing a credential with an unauthorized user 110.

Figure 10:
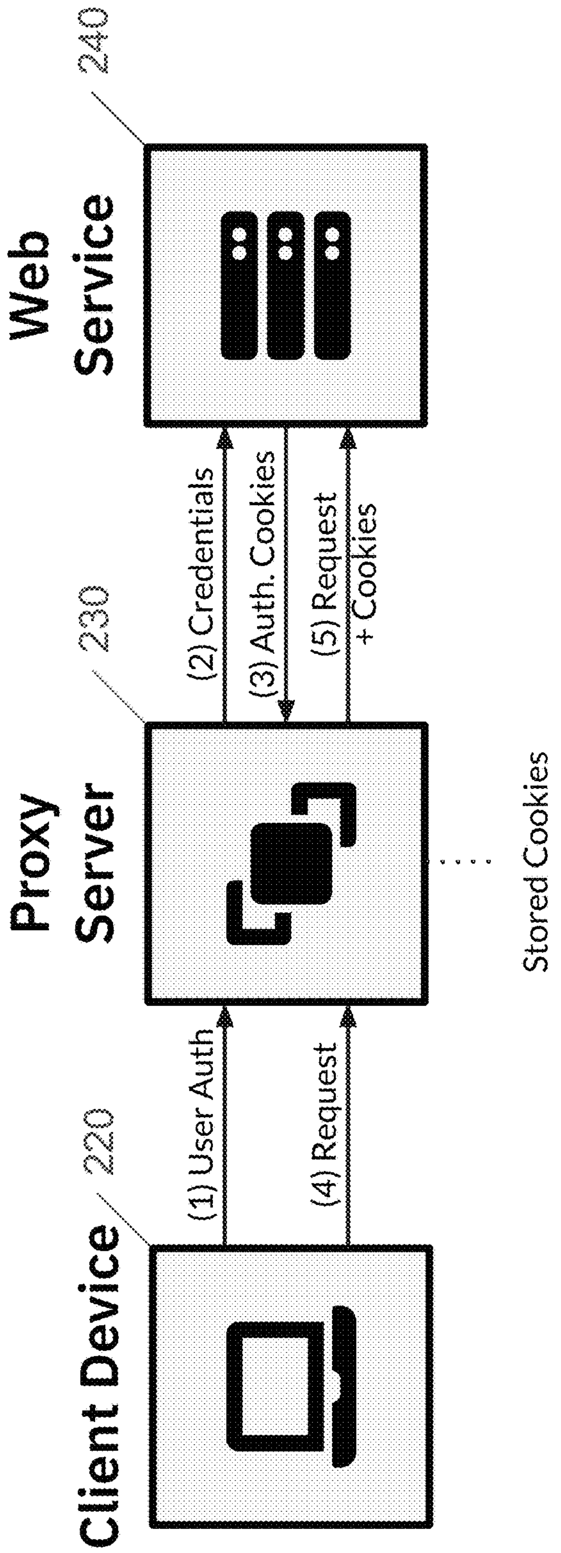
FIG. 10 shows a process of sharing online accounts using a secure system and method for sharing online accounts wherein the proxy server is further configured to intercept and store browser cookies created by the web service according to one embodiment of the present disclosure.

In one embodiment, shown in FIG. 10, the proxy server 230 is further configured to intercept and store browser cookies created by the web service 240. In a first step, a client device 220 authenticates with a proxy server 230 using an authentication protocol. In a second step, the proxy server 230 authenticates with a web service 240 using an authentication process. In a third step, the web service 240 returns an authentication token to the proxy server 230 in the form of one or more browser cookies, which is then stored on the proxy server. In a fourth step, the client device 220 sends a web request to the proxy server 230. In a fifth step, the proxy server 230 attaches the stored browser cookie(s) to the web request, thereby authenticating the request, and then forwards said request to the web service 240. Browser cookies containing authentication tokens are never stored in plaintext on the client device 220, thereby eliminating the threat of non-revocability as the lack of session persistence on the client device 220 ensures that revocations can take immediate effect.

Figure 11:
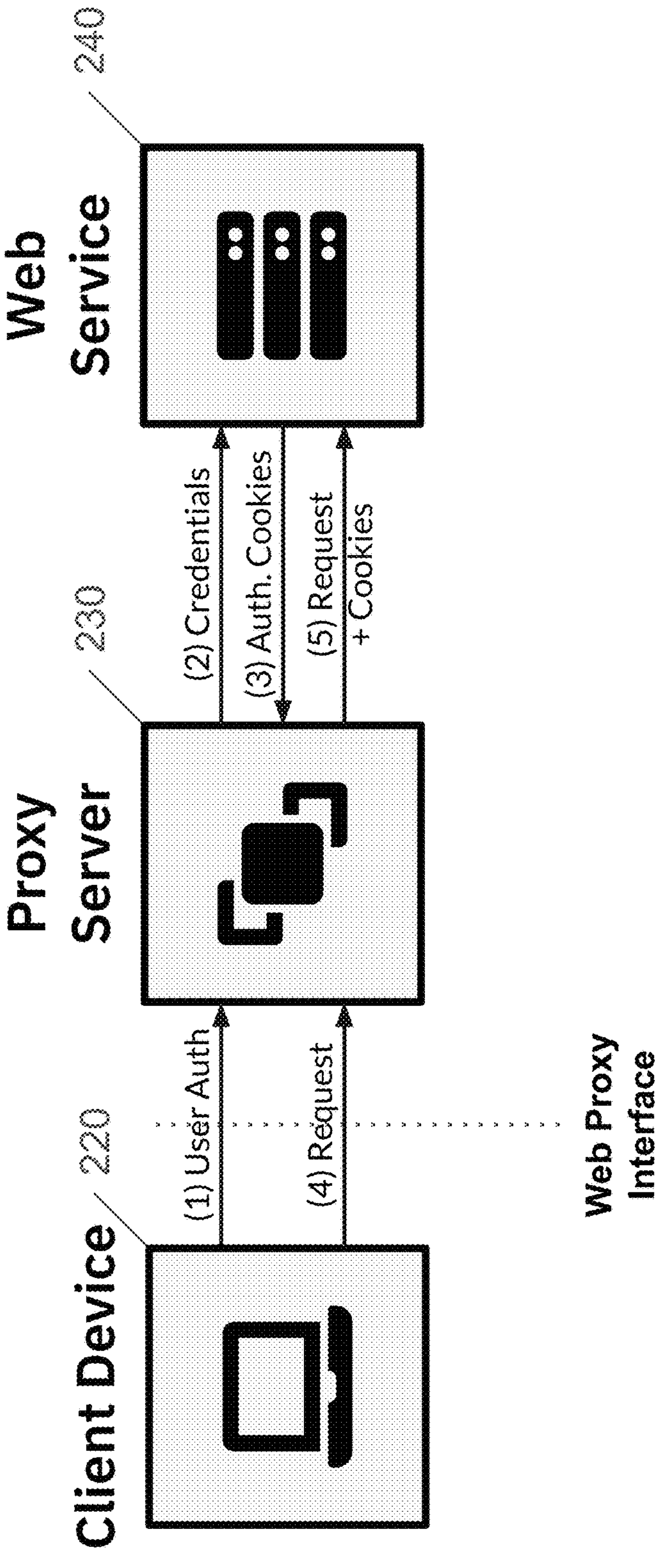
FIG. 11 shows a process of sharing online accounts using a secure system and method for sharing online accounts wherein the client device communicates with the proxy server via a standard HTTP/HTTPS web proxy interface according to one embodiment of the present disclosure.
Figure 12:
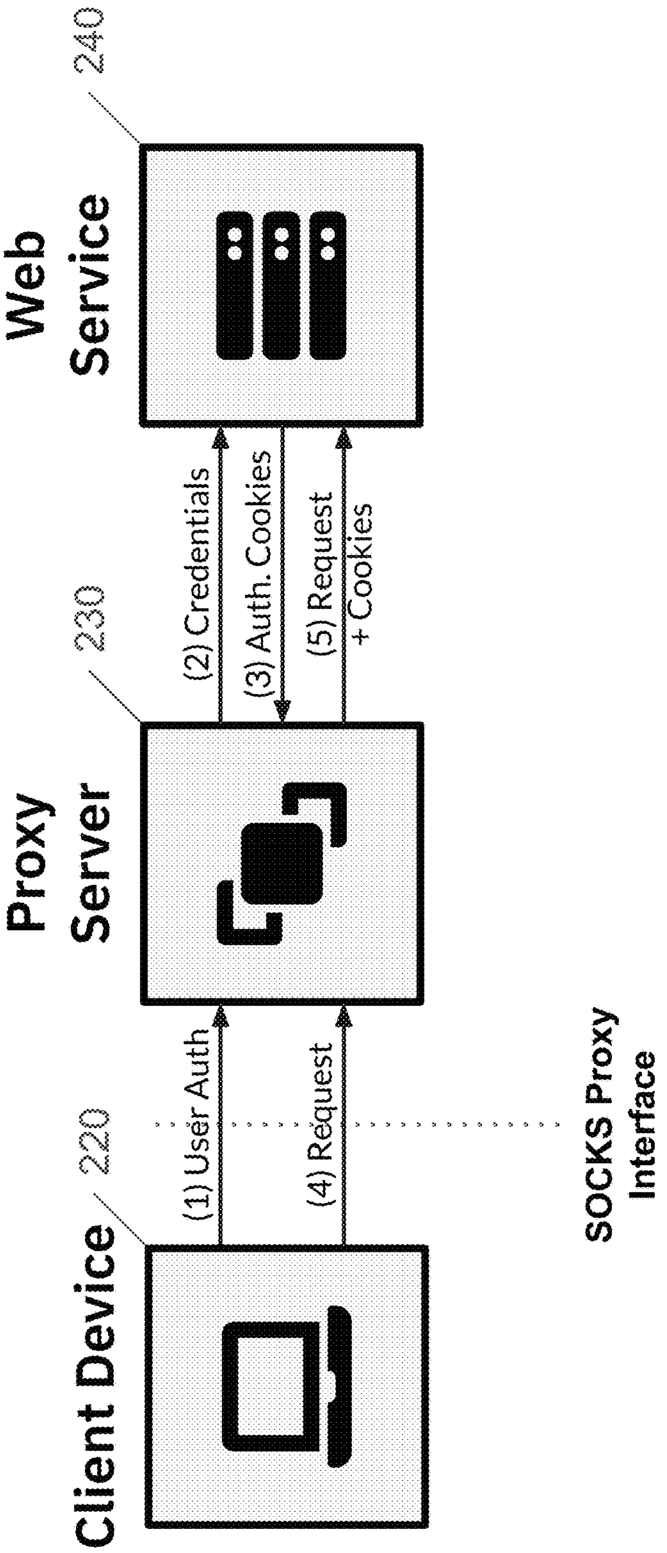
FIG. 12 shows a process of sharing online accounts using a secure system and method for sharing online accounts wherein the client device communicates with the proxy server via a standard SOCKS proxy interface according to one embodiment of the present disclosure.
Figure 13:
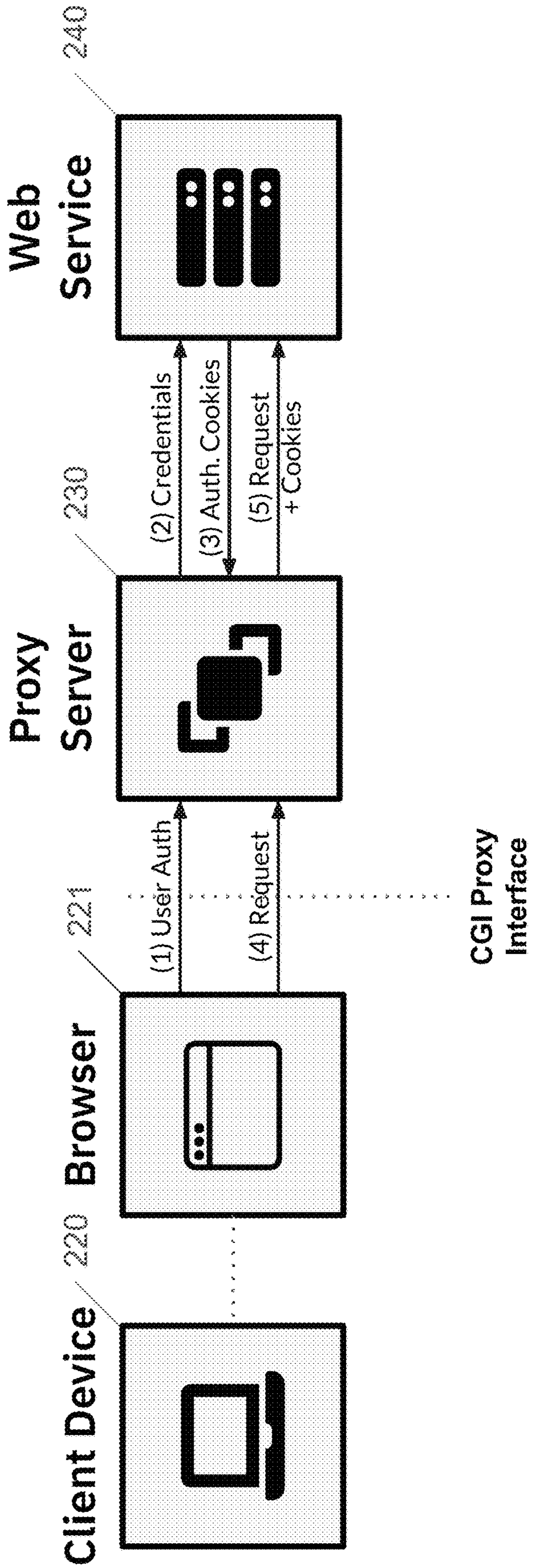
FIG. 13 shows a process of sharing online accounts using a secure system and method for sharing online accounts wherein the client device communicates with the proxy server via a CGI web proxy interface according to one embodiment of the present disclosure.
Figure 14:
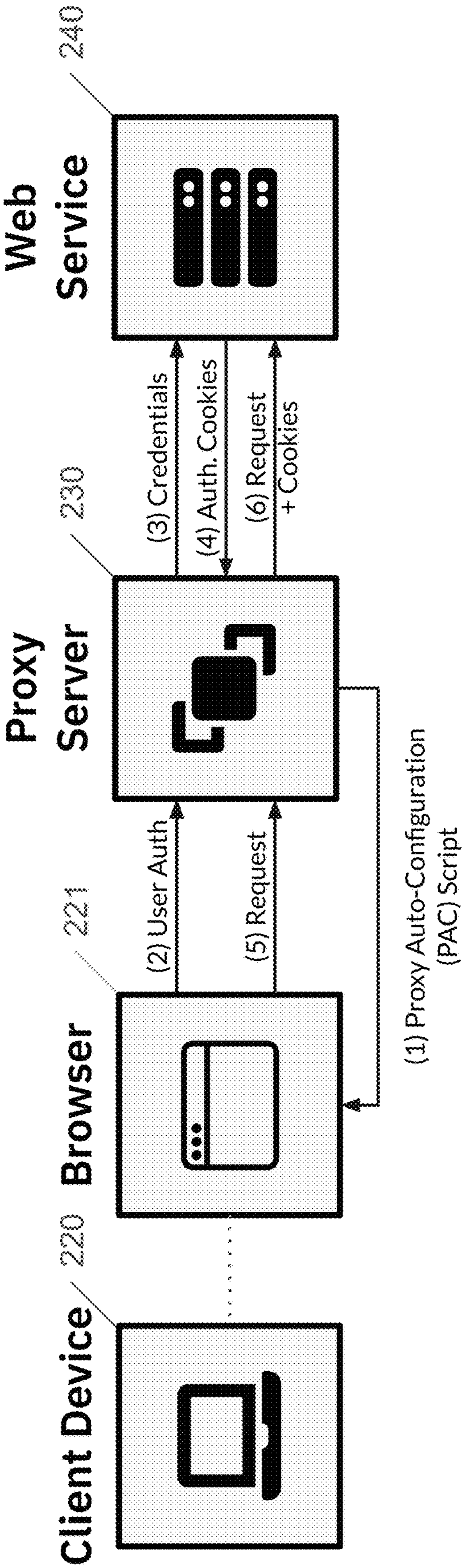
FIG. 14 shows a process of sharing online accounts using a secure system and method for sharing online accounts whereby a Proxy Auto-Configuration (PAC) script is further used to configure the client device to use the proxy server according to one embodiment of the present disclosure.
Figure 15:
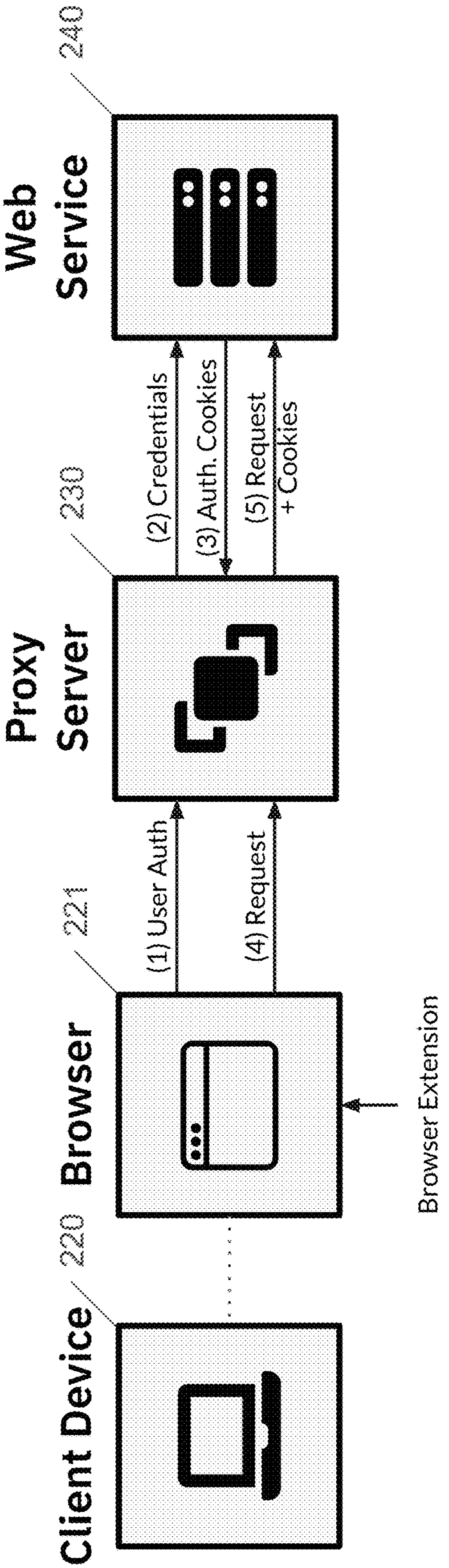
FIG. 15 shows a process of sharing online accounts using a secure system and method for sharing online accounts further comprising a browser extension on the client device according to one embodiment of the present disclosure.

In one embodiment, shown in FIG. 11, the client device 220 communicates with the proxy server 230 via a standard web proxy interface using the HTTP and/or HTTPS protocols. In such a configuration, the request from the client is similar to a standard HTTP and/or HTTPS request other than possible slight modifications such as providing the full URL in the request header instead of just the path. In another embodiment, shown in FIG. 12, the client device 220 communicates with the proxy server 230 via a SOCKS web proxy interface using the SOCKS4 or SOCKS5 protocol. In another embodiment, shown in FIG. 13, the client device 220 communicates with the proxy server 230 via a CGI web proxy interface using a browser 221 installed on the client device 220. In this configuration, the user 110 of the client device 220 loads a web portal provided by the proxy server 230 in the browser 221 and selects a target web service 240 using a user interface provided by the web portal. The proxy server 230 then processes the request and returns the results to the browser 221. In one embodiment, the proxy server 230 may provide multiple interfaces to the client device 220 using various different protocols, including any combination of the protocols previously described, for example by hosting each protocol on a separate port, so as to provide a variety of options for accessing the proxy server 230. In another embodiment, shown in FIG. 14, a proxy auto-configuration (PAC) script is used to configure a browser 221 installed on a client device 220 to use a proxy server 230, such as to configure the browser 221 to use the protocol, IP address, and port number associated with the proxy server 230, and/or to prioritize the various protocols offered by the proxy server 230 if multiple protocols are offered. In another embodiment, shown in FIG. 15, a browser extension is used to configure a browser 221 installed on a client device 220 to use a proxy server 230 and/or to facilitate communication between the client device 220 and the proxy server 230, such as by attaching digital signatures to the requests of the client device 220.

Figure 16:
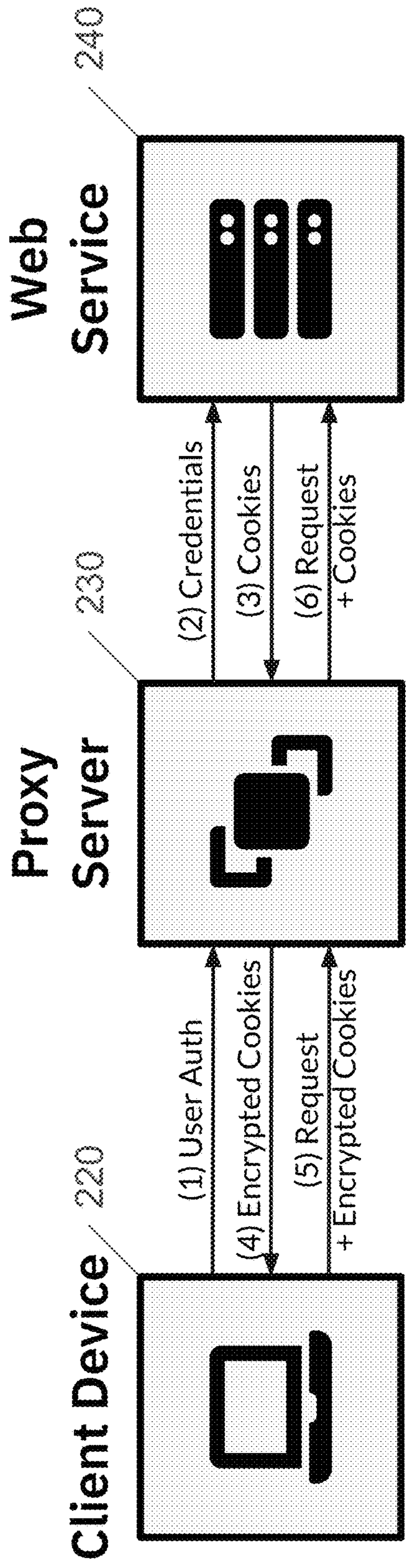
FIG. 16 shows a process of sharing online accounts using a secure system and method for sharing online accounts wherein the proxy server is further configured to encrypt browser cookies created by the web service according to one embodiment of the present disclosure.

In one embodiment, shown in FIG. 16, the proxy server 230 is further configured to encrypt browser cookies created by the web service 240. In a first step, a client device 220 authenticates with a proxy server 230 using an authentication protocol. In a second step, the proxy server 230 authenticates with a web service 240 using an authentication process. In a third step, the web service 240 returns an authentication token to the proxy server 230 in the form of one or more browser cookies, which are then encrypted by the proxy server. In a fourth step, the encrypted cookies are sent from the proxy server 230 to the client device 220, where they are stored. In a fifth step, the client device 220 sends a web request to the proxy server 230, with the encrypted cookies attached to the request. In a sixth step, the proxy server 230 decrypts the cookies and attaches them to the web request, thereby authenticating the request, and then forwards said request to the web service 240. Storing browser cookies containing authentication tokens in plaintext on the client device 220 is avoided, thereby eliminating the threat of non-revocability while still not requiring cookies to be stored on the proxy server 230.

Figure 17:
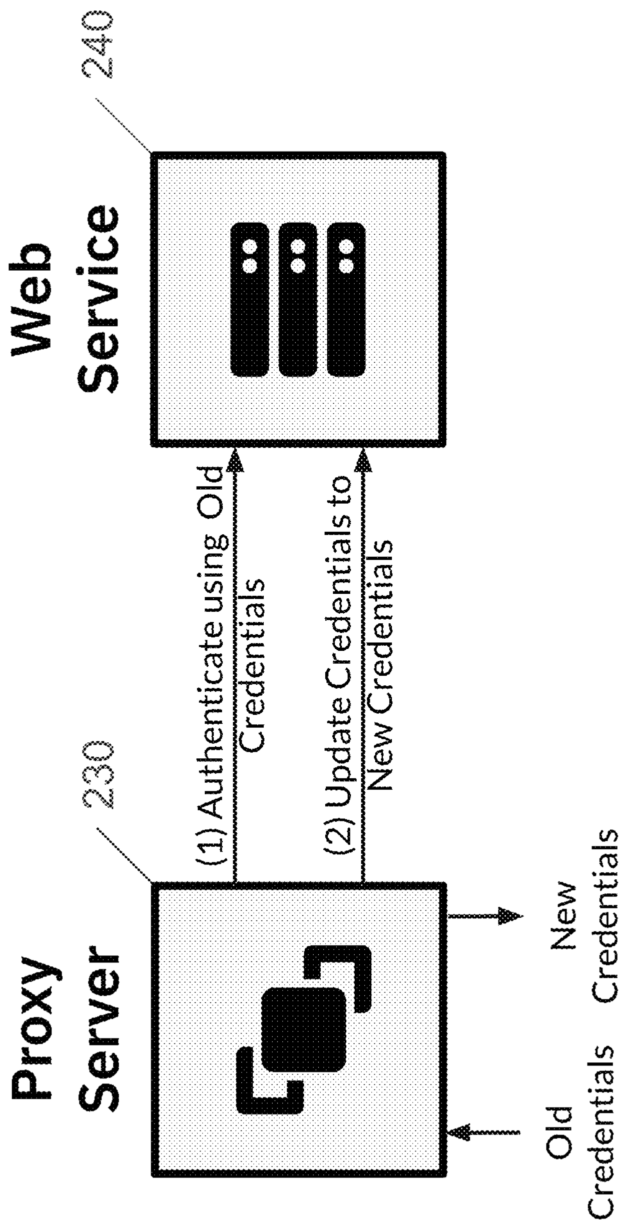
FIG. 17 shows a process of sharing online accounts using a secure system and method for sharing online accounts wherein the proxy server is further configured to modify the credentials associated with the shared account according to one embodiment of the present disclosure.

In one embodiment, shown in FIG. 17, the proxy server 230 is further configured to modify the credentials associated with the shared account 241. In a first step, a proxy server 230 uses credentials associated with a shared account 241 to authenticate with a web service 240 hosting the shared account 241. In a second step, the proxy server 240 generates new credentials for the shared account and instructs the web service 240 to update the credentials associated with the shared account 241 to the new credentials. In one embodiment, the new credentials are stored only on the proxy server 230, such that said credentials are only known to the proxy server 230. Therefore, no user 110, including the user 110 who initially established the shared account 241, knows the credentials, ensuring that all accesses of the shared account 241 must go through the proxy server 230.

Figure 18:
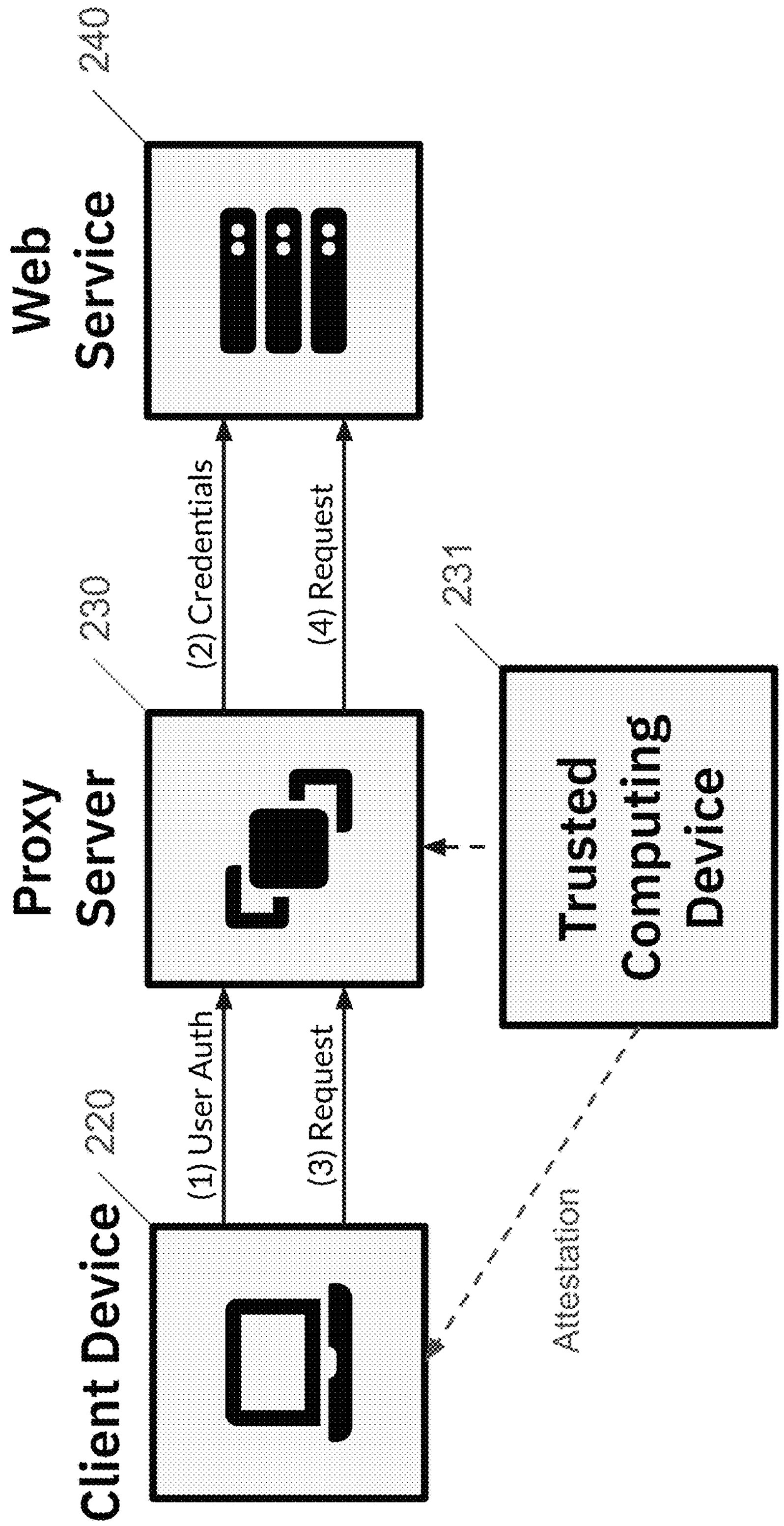
FIG. 18 shows a process of sharing online accounts using a secure system and method for sharing online accounts further comprising a trusted computing device on the proxy server according to one embodiment of the present disclosure.
Figure 19:
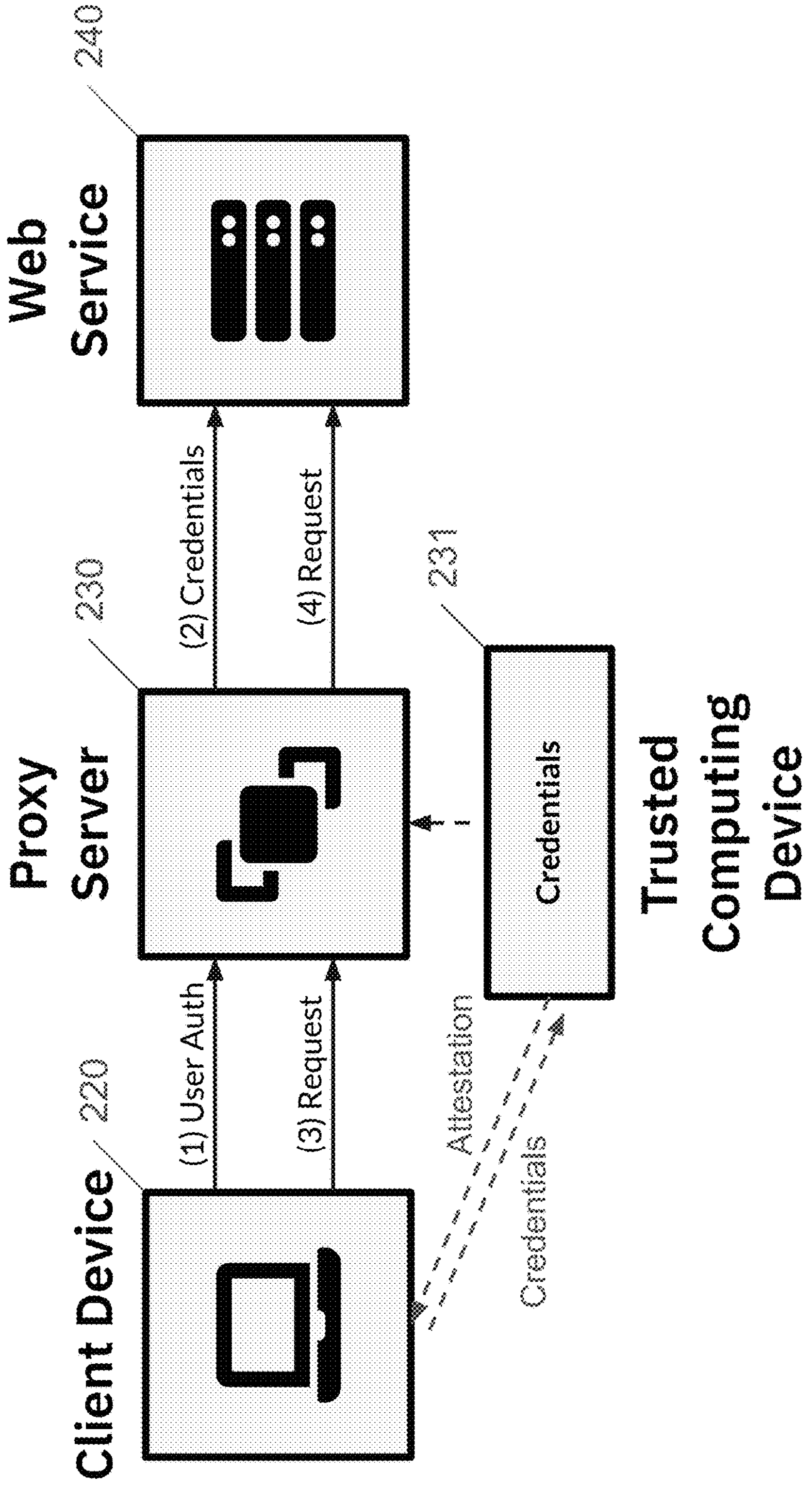
FIG. 19 shows a process of sharing online accounts using a secure system and method for sharing online accounts wherein a trusted computing device is used to preclude misuse of the credentials associated with the shared account by the proxy server according to one embodiment of the present disclosure.
Figure 20:
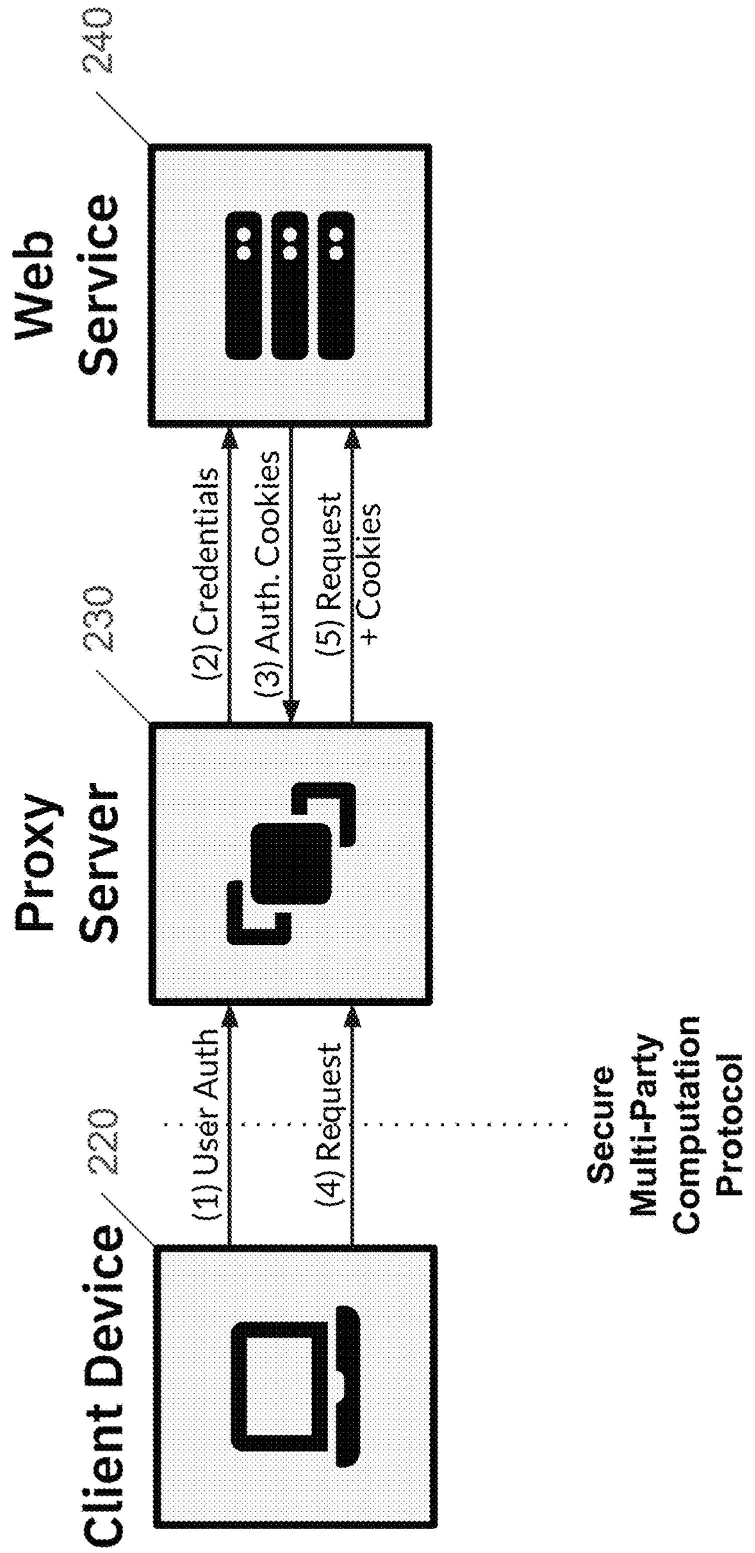
FIG. 20 shows a process of sharing online accounts using a secure system and method for sharing online accounts wherein a secure multi-party computation (MPC) protocol is used between the proxy server and the client device according to one embodiment of the present disclosure.

In one embodiment, shown in FIG. 18, the proxy server 230 contains a trusted computing device 231. A client device 220 can verify, via an attestation process with the trusted computing device 231, that the proxy server is running legitimate code. The trusted computing device 231 can be used to ensure that the proxy server does not tamper with, modify, or misuse requests sent by the client device 220, for example by terminating an SSL/TLS session between the client device 220 and proxy server 230 within the trusted computing device 231, and by similarly terminating an SSL/TLS session between the web service 240 and proxy server 230 within the trusted computing device 231, such that the request data is only available in plaintext within the trusted computing device 231 and can therefore not be misused by the proxy server 230. In one embodiment, shown in FIG. 19, the trusted computing device 231 is further used to preclude misuse of the credentials associated with the shared account 241 by the proxy server 230. A client device 220 can obtain a cryptographic key associated with the trusted computing device 231 via an attestation process and provide credentials to the proxy server 230 encrypted with said cryptographic key, thereby ensuring that said credentials are only available within the trusted computing device 231. In another embodiment, shown in FIG. 20, a secure multi-party computation (MPC) protocol is used between the proxy server 230 and the client device 220. MPC techniques make it possible for the proxy server to modify requests, such as to insert a credential or authentication token, without being able to read the contents of the request directly or revealing credentials to the client device 220. Therefore, MPC provides an alternative means of providing the same security properties as a trusted computing device 231, such as precluding misuse of the credentials associated with the shared account 241 by the proxy server 230.

Figure 21:
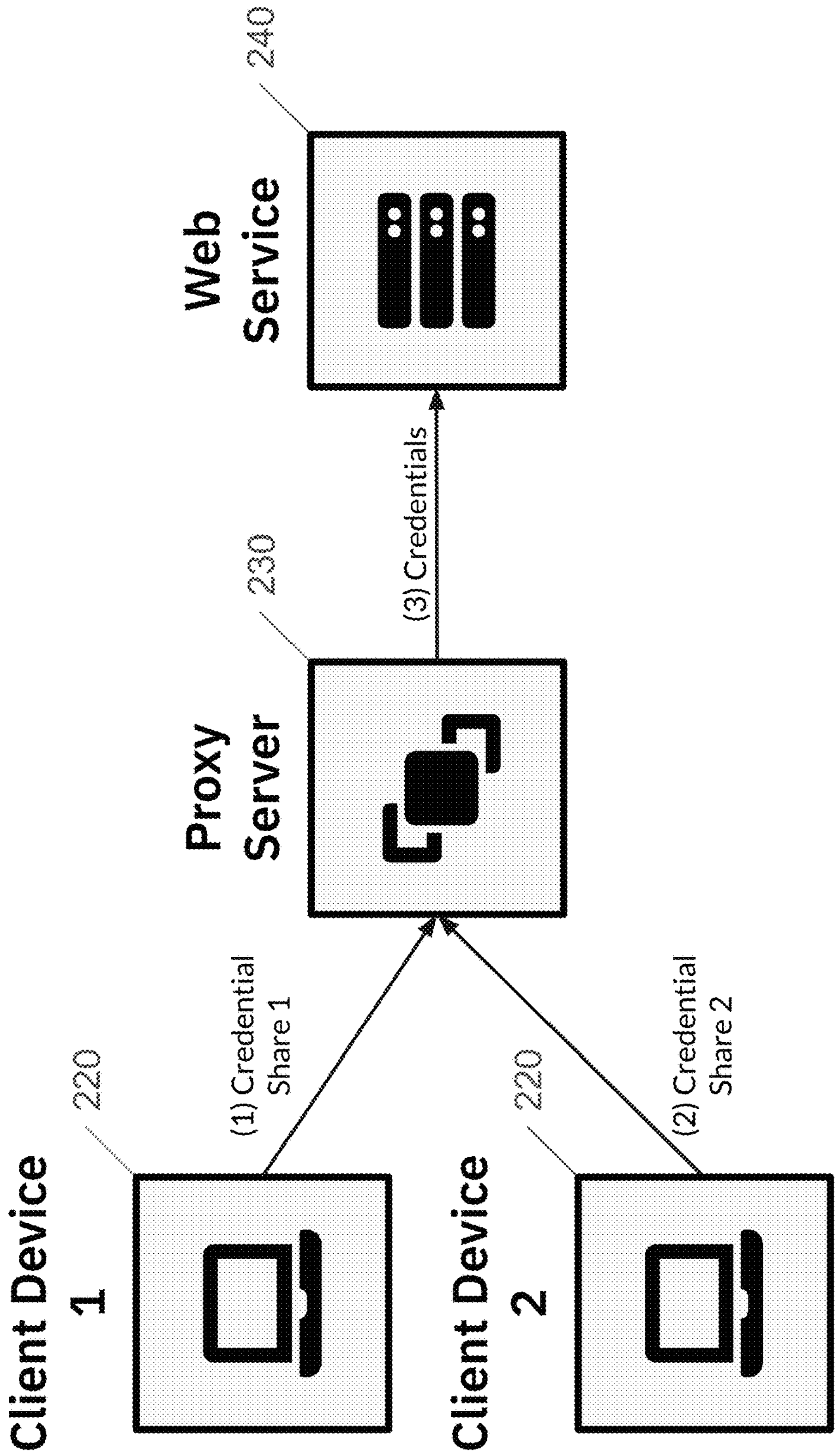
FIG. 21 shows a process of sharing online accounts using a secure system and method for sharing online accounts wherein credentials associated with the shared account are shared across at least two client devices using a secret sharing algorithm according to one embodiment of the present disclosure.

In one embodiment, shown in FIG. 21, a credential associated with the shared account 241 is shared across at least two client devices 220 using a secret sharing algorithm such as Shamir's secret sharing scheme. First, a credential associated with the shared account 241 is shared across at least two client devices using a secret sharing algorithm. Later, at least two client devices 220 send their corresponding share of the credential to the proxy server 230. The proxy server 230 then re-constructs the credential from the shares using the secret sharing algorithm and uses the reconstructed credential to authenticate with the web service 240.

Figure 22:
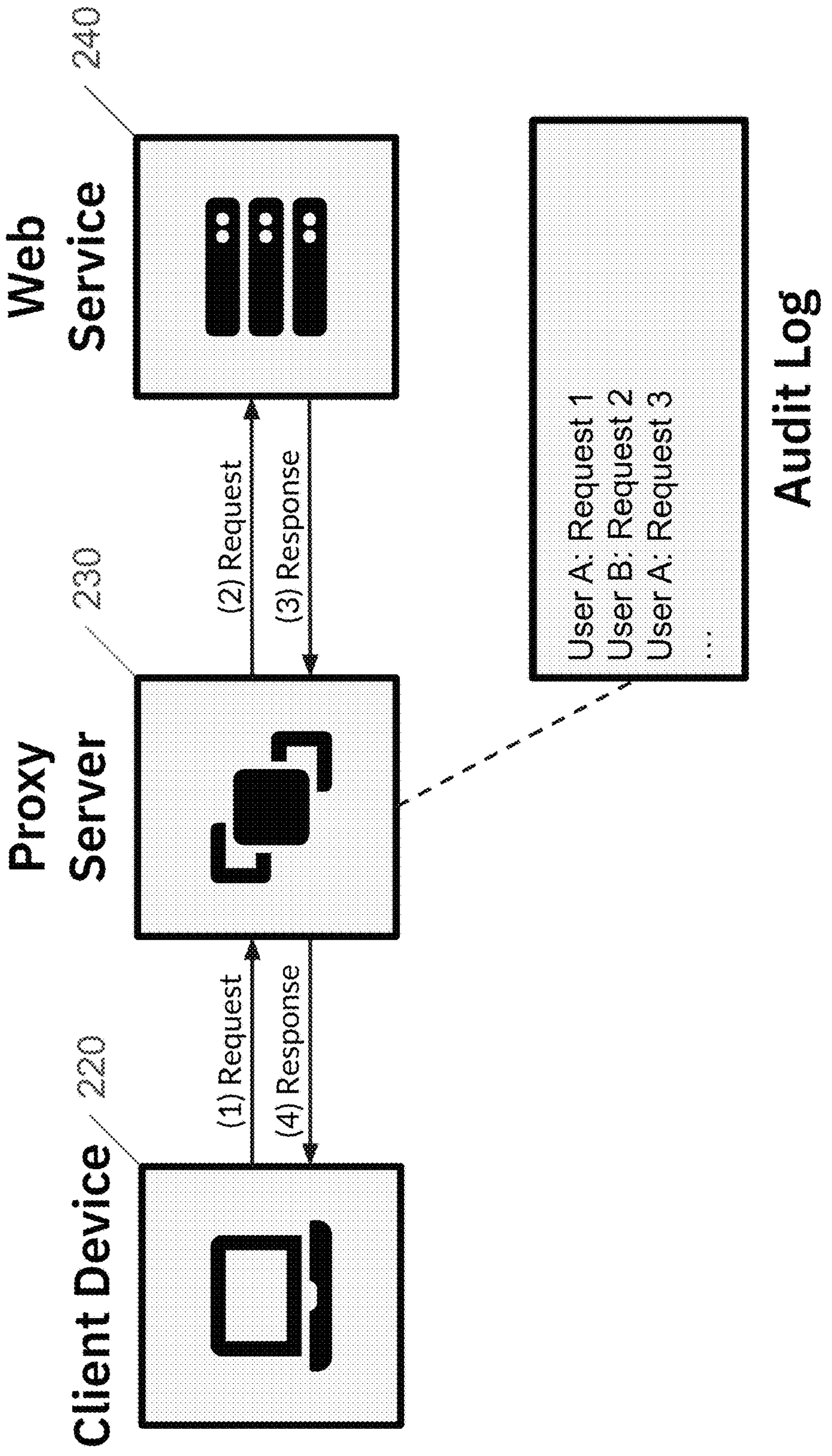
FIG. 22 shows a process of sharing online accounts using a secure system and method for sharing online accounts wherein the proxy server further maintains a log of requests made by the client device according to one embodiment of the present disclosure.
Figure 23:
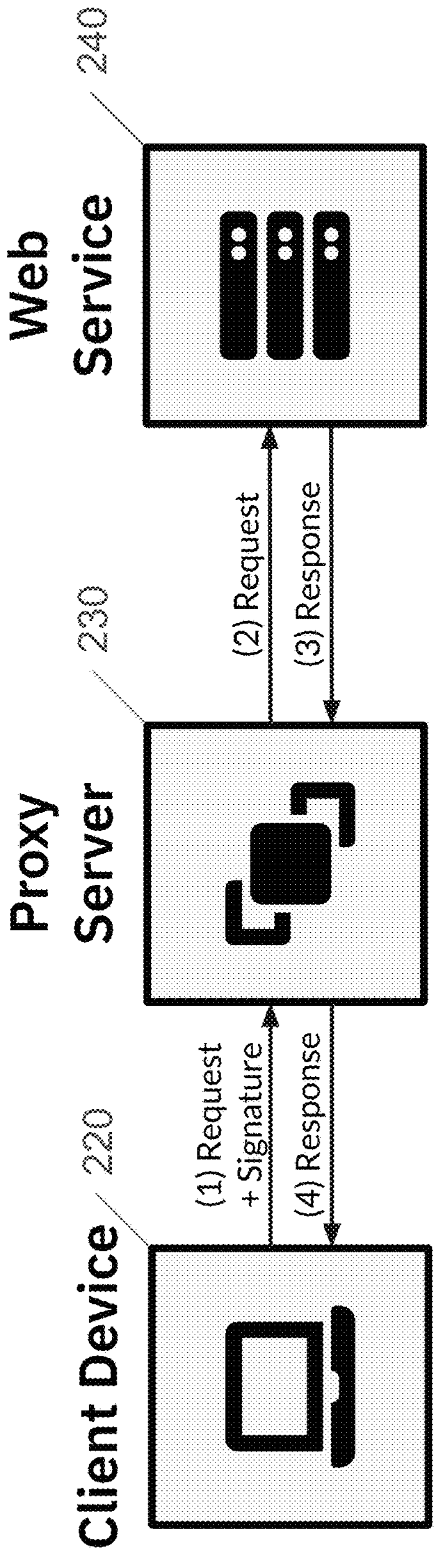
FIG. 23 shows a process of sharing online accounts using a secure system and method for sharing online accounts wherein the client device further attaches a digital signature to requests made to the proxy server according to one embodiment of the present disclosure.
Figure 24:
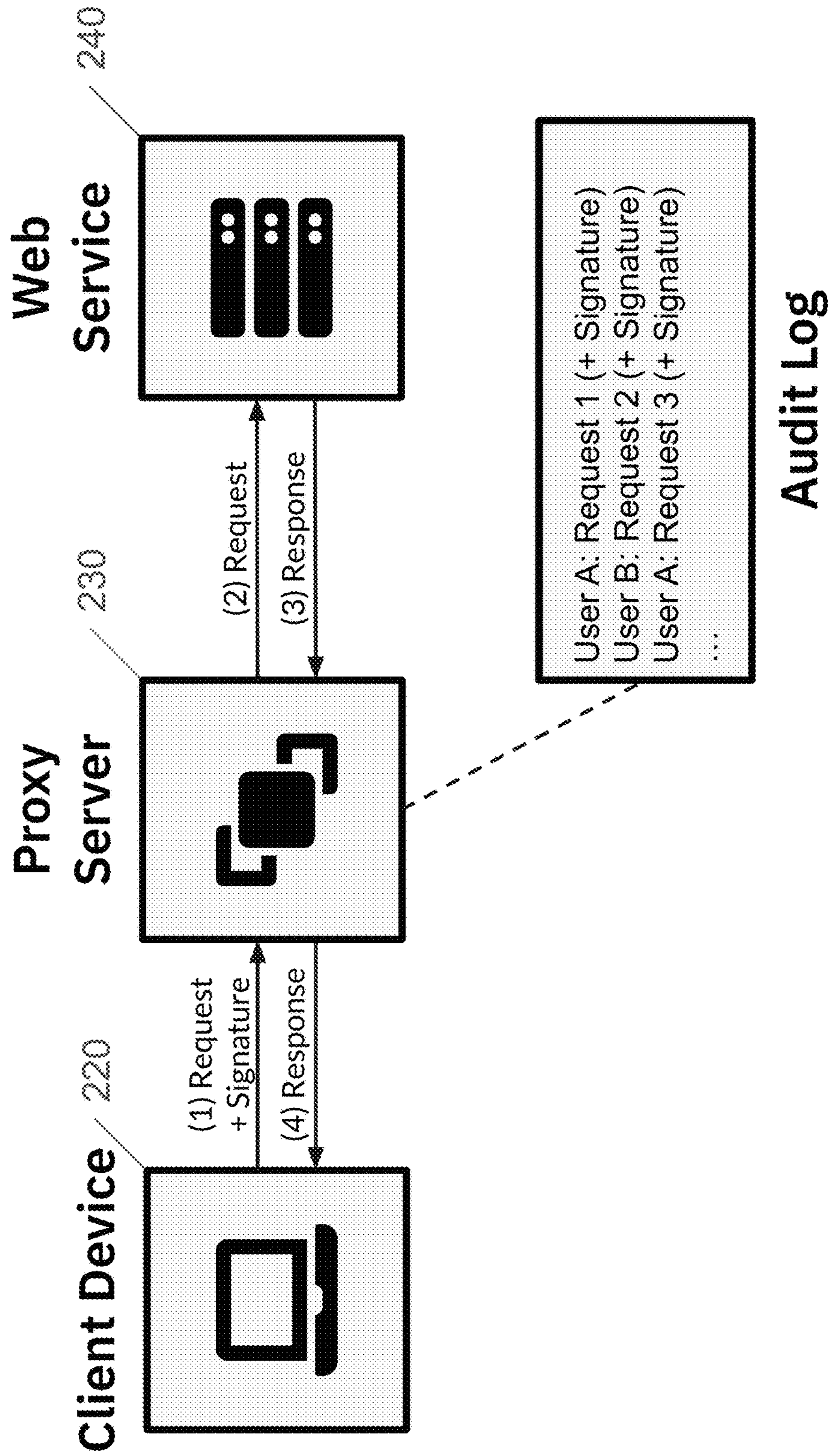
FIG. 24 shows a process of sharing online accounts using a secure system and method for sharing online accounts wherein a log of requests further includes digital signatures provided by the client device according to one embodiment of the present disclosure.
Figure 25:
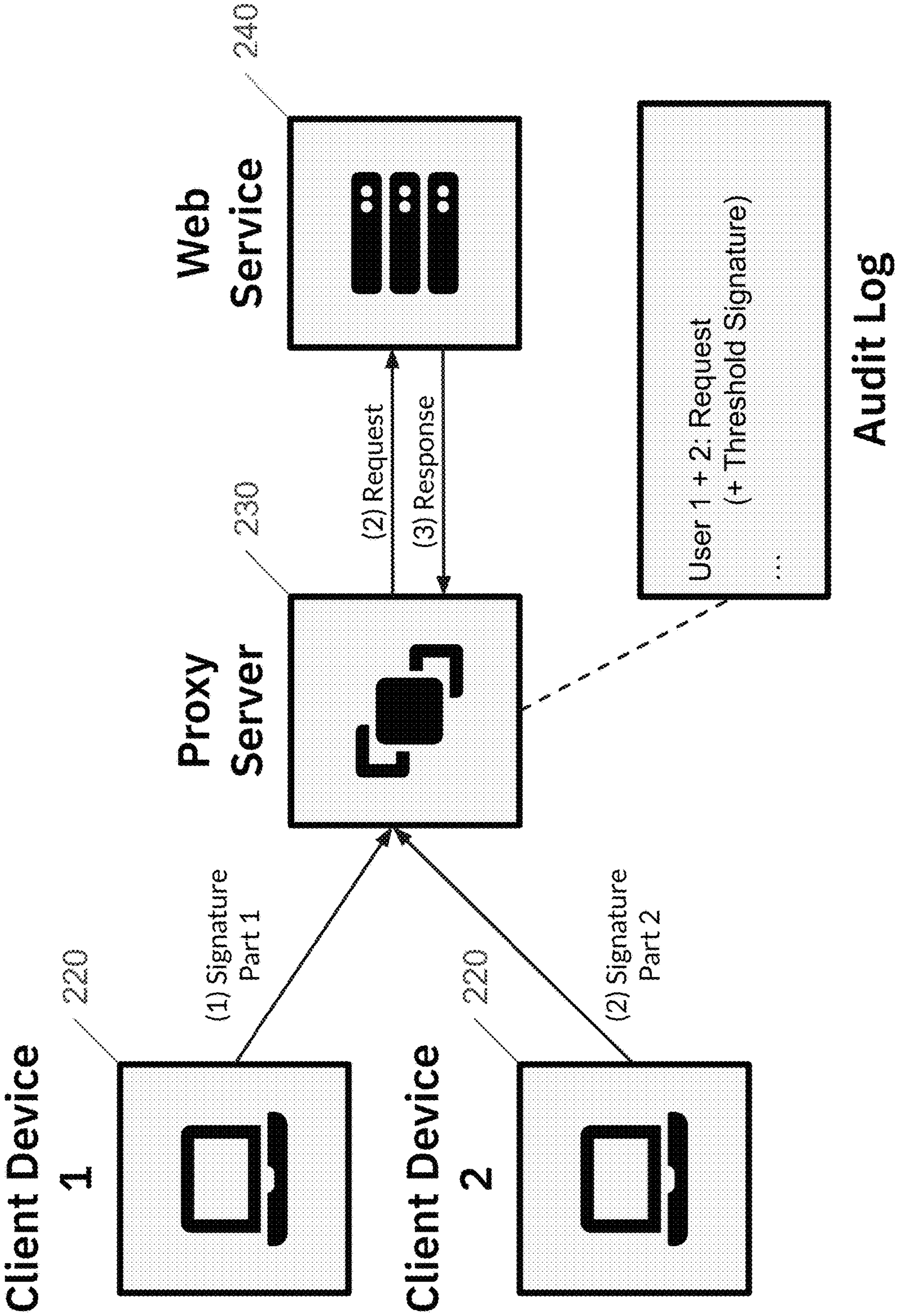
FIG. 25 shows a process of sharing online accounts using a secure system and method for sharing online accounts wherein at least two client devices produce a threshold signature, which is further attached to requests made to the proxy server according to one embodiment of the present disclosure.

In one embodiment, shown in FIG. 22, the proxy server 230 maintains a log of requests made by the client device 220. When the client device 220 makes a request to the proxy server 230, the contents of the request can be stored by the proxy server for a period of time. Information such as the IP address of the client device 220 may also be included with a record in the log. Furthermore, if the identity of the user 110 of the client device 220 is known to the proxy server 230, for example via an authentication process, then the identity of the user 110 may also be included with a record in the log. The purpose of maintaining an audit log of requests is to ensure that a request made to a shared account 241 can later be traced back to the specific principal initiating the request. In one embodiment, the audit log is made tamper-resistant by using a blockchain data structure. In another embodiment, shown in FIG. 23, the client device 220 further attaches a digital signature to requests made to the proxy server 230 using a digital signature algorithm. The purpose of attaching a digital signature to all requests is to prove that the request was authorized by the principal providing the signature. In a further embodiment, shown in FIG. 24, digital signatures provided by the client device 220 may also be included with a record in the log, thus providing nonrepudiation as the logged signature prevents a principal from later claiming that they did not initiate a given request. In another embodiment, shown in FIG. 25, at least two client devices produce a threshold signature using a threshold signing scheme, which is attached to requests made to the proxy server. The use of a threshold signature ensures that at least some number of principals agree on a given request. In a further embodiment, threshold signatures may also be included with each record in the log, thus providing future proof that at least a threshold number of principals authorized a given request.

Figure 26:
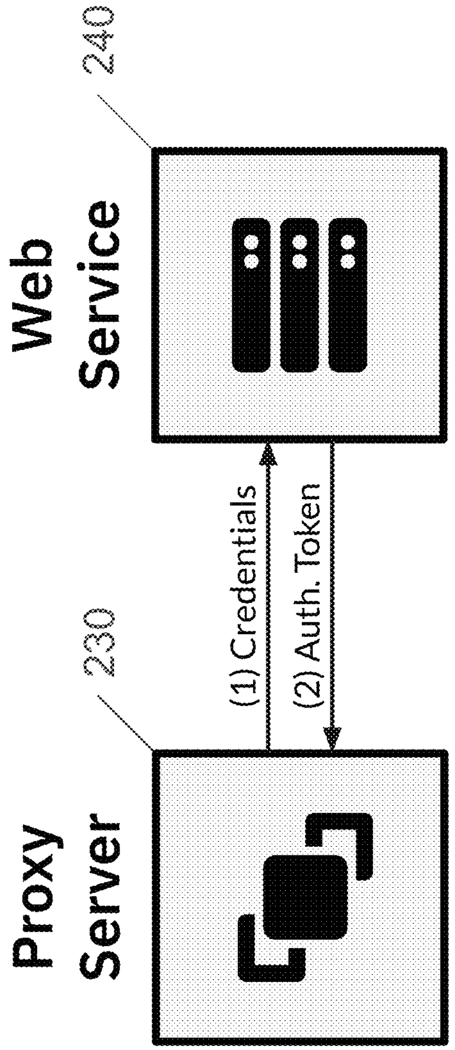
FIG. 26 shows a process of a proxy server authenticating with the web service using credentials associated with the shared account according to one embodiment of the present disclosure.
Figure 27:
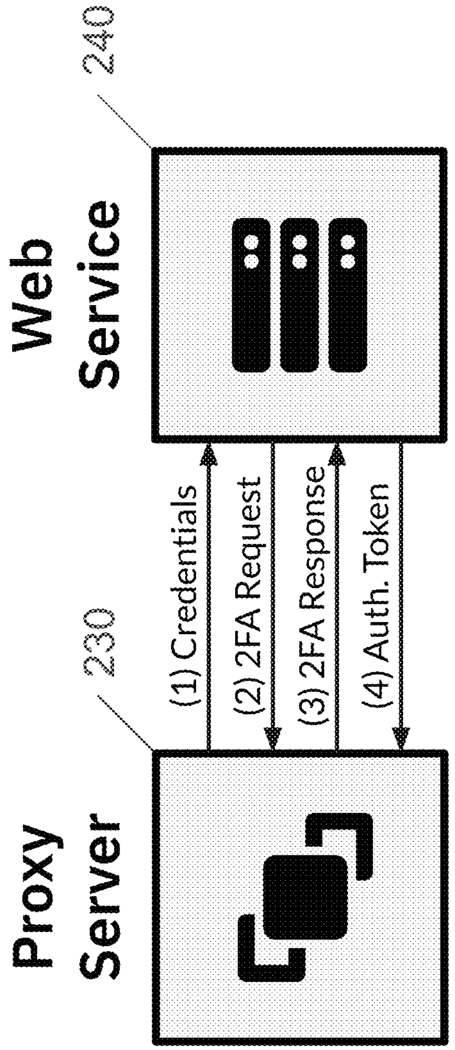
FIG. 27 shows a process of a proxy server authenticating with the web service using a multi-factor authentication process according to one embodiment of the present disclosure.

In one embodiment, a proxy server 230 authenticates with a web service 240 using credentials associated with a shared account 241 as shown in FIG. 26. In a further embodiment, shown in FIG. 27, a proxy server 230 authenticates with a web service 240 using a multi-factor authentication process. In a first step, a proxy server 230 presents a first authentication factor to the web service 240. In a second step, the web service 240 requests a second authentication factor. In a third step, the proxy server 230 responds with a second authentication factor. Steps 2 and 3 may be repeated for each additional authentication factor as required. In a final step, the web service 240 responds with an authentication token if all of the presented authentication factors are correct.

Figure 28:
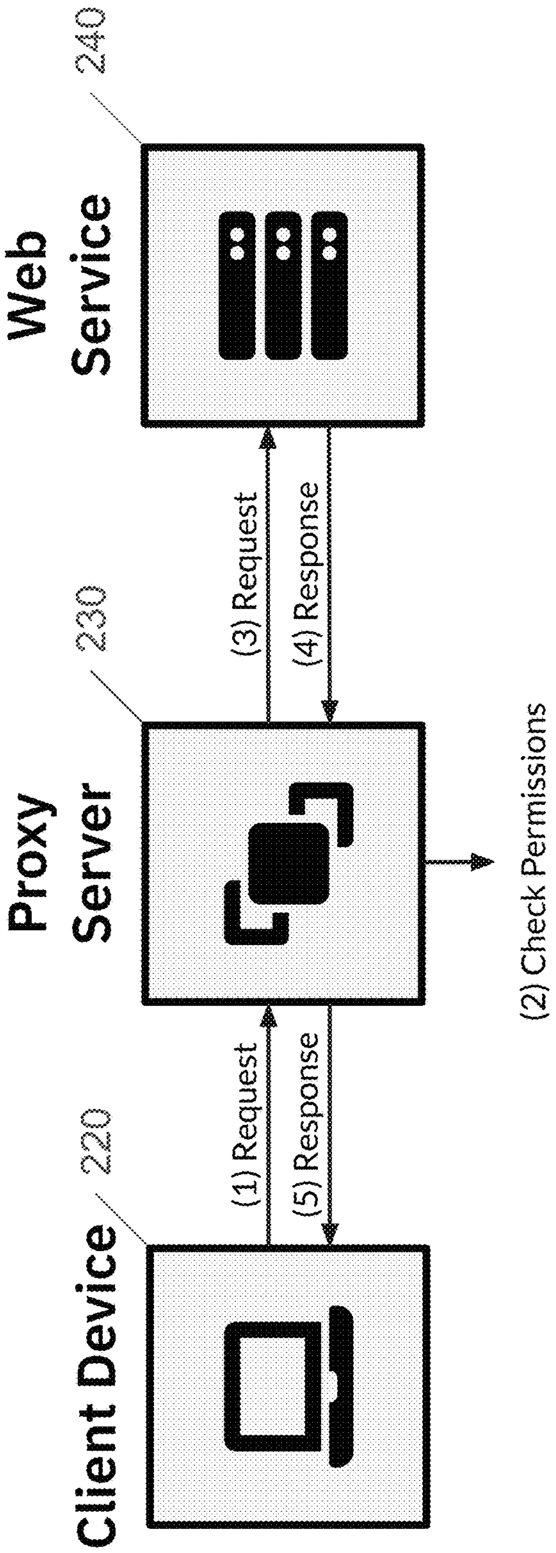
FIG. 28 shows a process of sharing online accounts using a secure system and method for sharing online accounts wherein the proxy server is further configured to reject certain requests of the client device depending on the content of the request according to one embodiment of the present disclosure.
Figure 29:
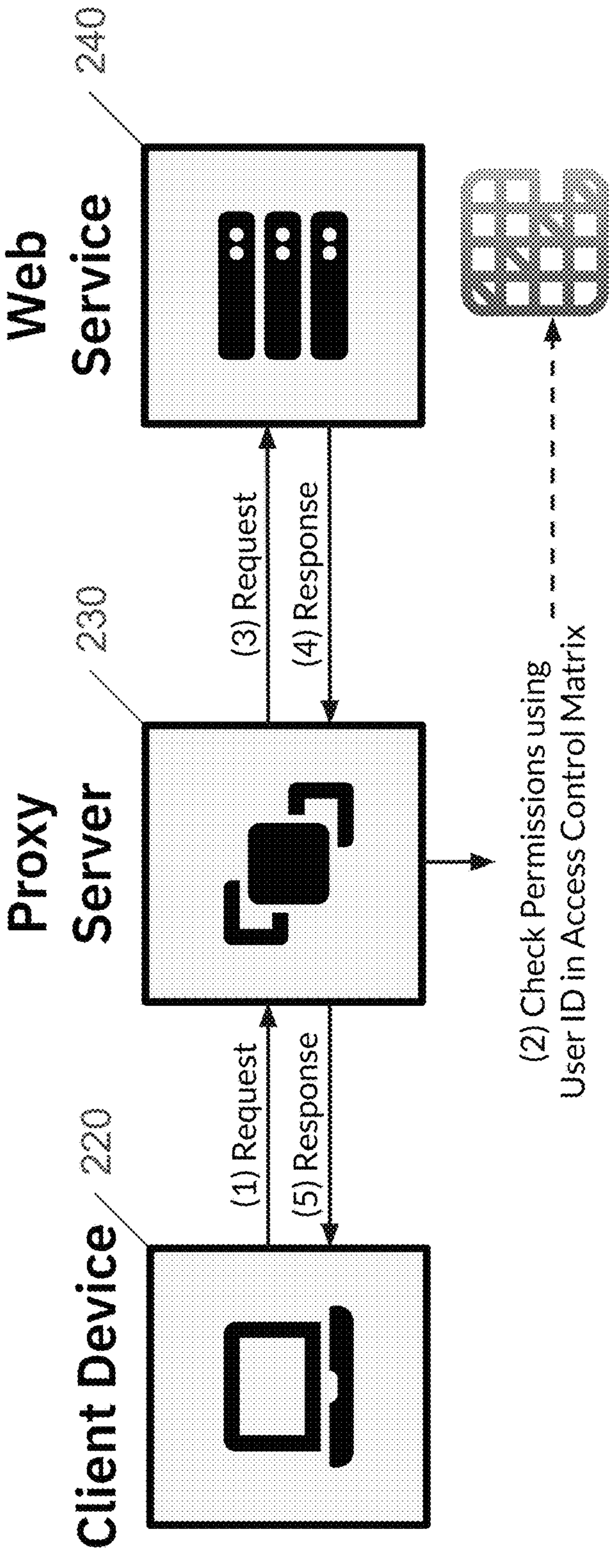
FIG. 29 shows a process of sharing online accounts using a secure system and method for sharing online accounts wherein an access control matrix is used to define different permissions depending on the identity of the principal using the client device according to one embodiment of the present disclosure.
Figure 30:
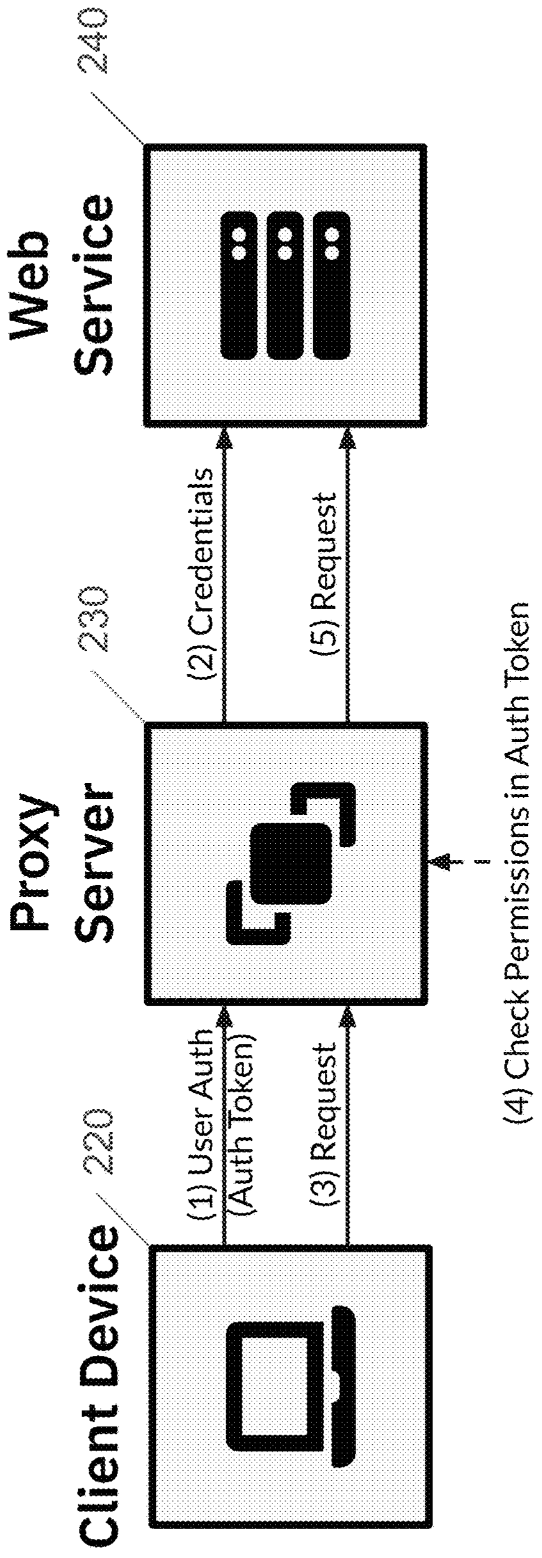
FIG. 30 shows a process of sharing online accounts using a secure system and method for sharing online accounts wherein an authentication token provided by the client device contains information used to define which requests are rejected according to one embodiment of the present disclosure.
Figure 31:
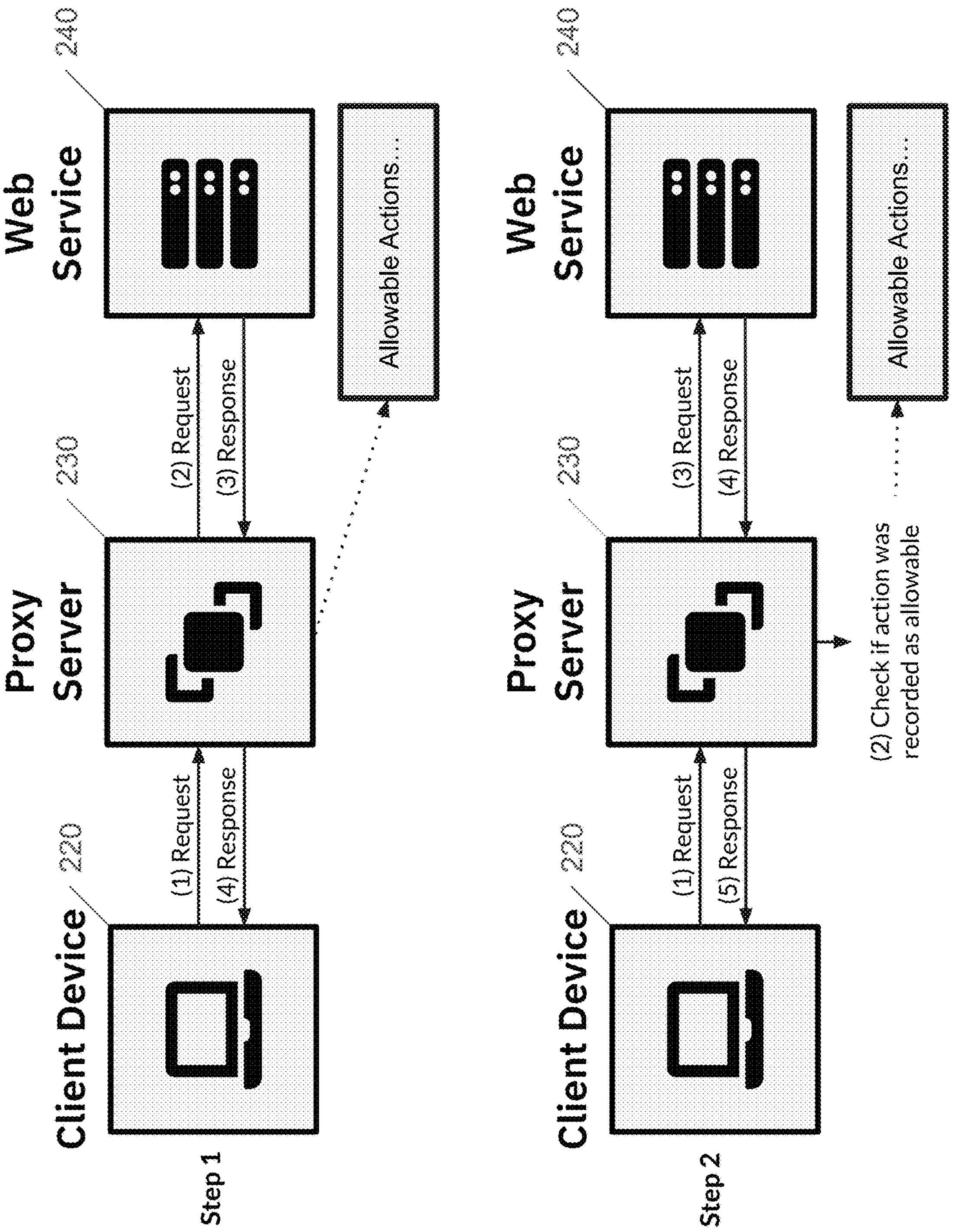
FIG. 31 shows a process of sharing online accounts using a secure system and method for sharing online accounts wherein a policy can be created by recording allowable request types during a standard browsing session according to one embodiment of the present disclosure.
Figure 32:
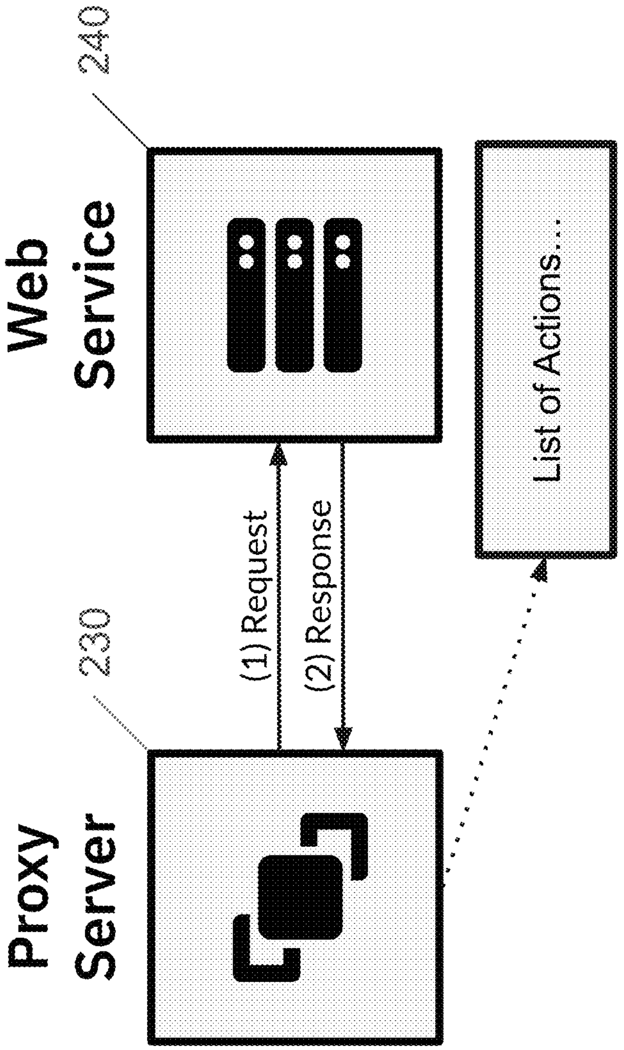
FIG. 32 shows a process of a policy being created automatically by crawling the pages of the web service according to one embodiment of the present disclosure.

In one embodiment, shown in FIG. 28, the proxy server 230 is configured to reject certain requests of the client device 220 depending on the content of the request. The proxy server 230 could be configured to filter traffic based on the request URL, for example allowing requests to the "/balance" page while not allowing requests to "/transfer" page. The proxy server 230 could further be configured to reject requests to settings pages where account credentials can be updated, thereby preventing users 110 from modifying the credentials associated with a shared account 241. In one embodiment, shown in FIG. 29, an access control matrix is used to define different permissions depending on the identity of the principal using the client device 220. For example, a first user 110 may have permission to access the "/balance" page while not allowing requests to "/transfer" page, while a second user 110 may have permission to access both the "/balance" page and the "/transfer" page. In another embodiment, shown in FIG. 30, an authentication token provided by the client device 220 contains information used to define which requests are rejected. A client device 220 can provide an authentication token such as a JSON Web Token (JWT) with embedded claims containing the allowable actions of the client device 220. In another embodiment, shown in FIG. 31, the access policy can be created by recording allowable request types during a standard browsing session. In a first step, a user 110 browses a web service 240 via a proxy server 230, which records the requests made during the browsing session as allowable requests. In a second step, a user 110 browses a web service 240 via a proxy server 230, whereby actions previously recorded as allowable are permitted. In another embodiment, shown in FIG. 32, an access policy is created automatically by the proxy server 230 by crawling the pages of the web service 240. In a further embodiment, machine learning is used to automatically classify requests as allowable or unallowable based on their contents. In another embodiment, regular expressions are further used to define which requests are rejected. In a further embodiment, a policy scripting language is further used to determine which requests are rejected. In another embodiment, a markup language (such as JSON or XML) is further used to define which requests are rejected.

Figure 33:
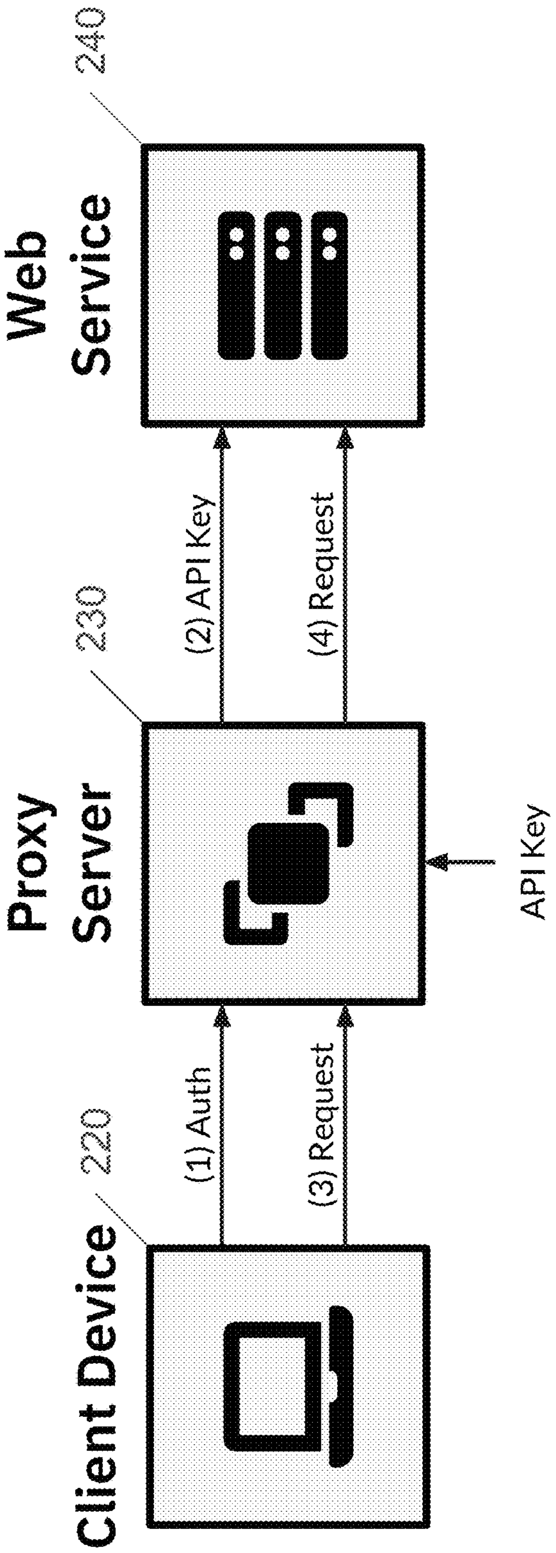
FIG. 33 shows a process of sharing online accounts using a secure system and method for sharing online accounts wherein the proxy server is further configured to store an API key associated with an API of the web service according to one embodiment of the present disclosure.
Figure 34:
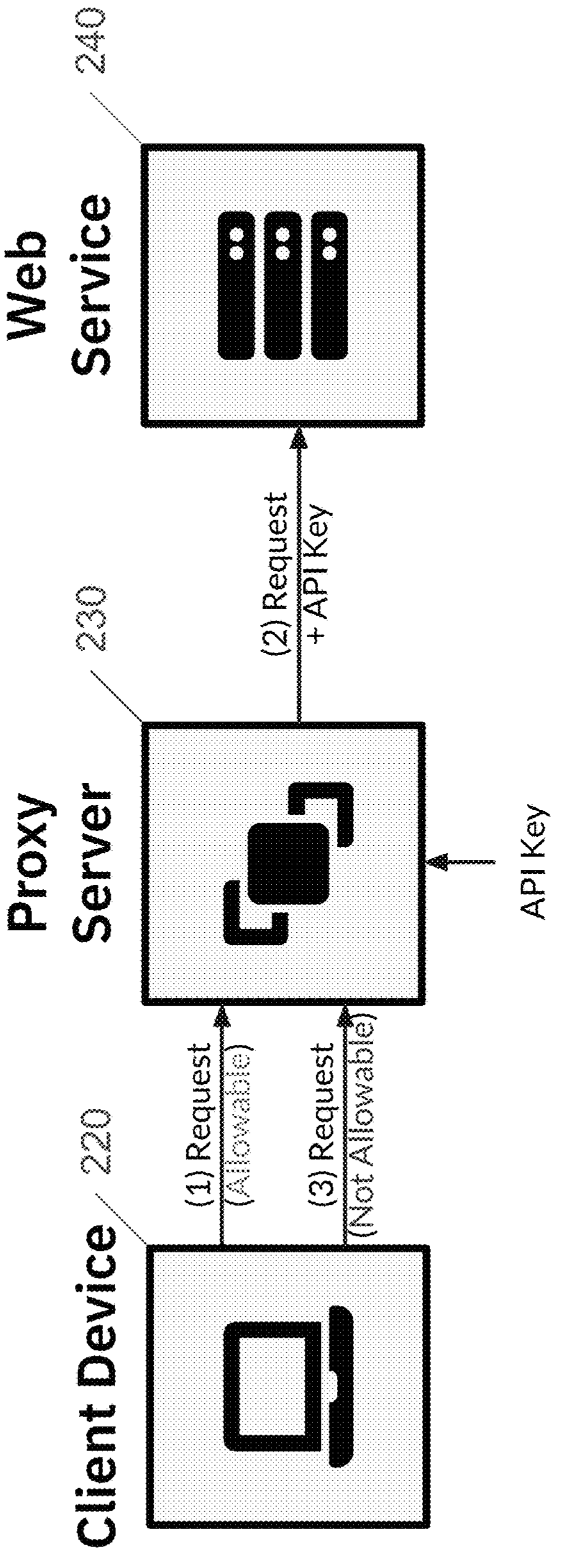
FIG. 34 shows a process of sharing online accounts using a secure system and method for sharing online accounts wherein the proxy server is further configured to allow only certain requests to the API based on their contents according to one embodiment of the present disclosure.
Figure 35:
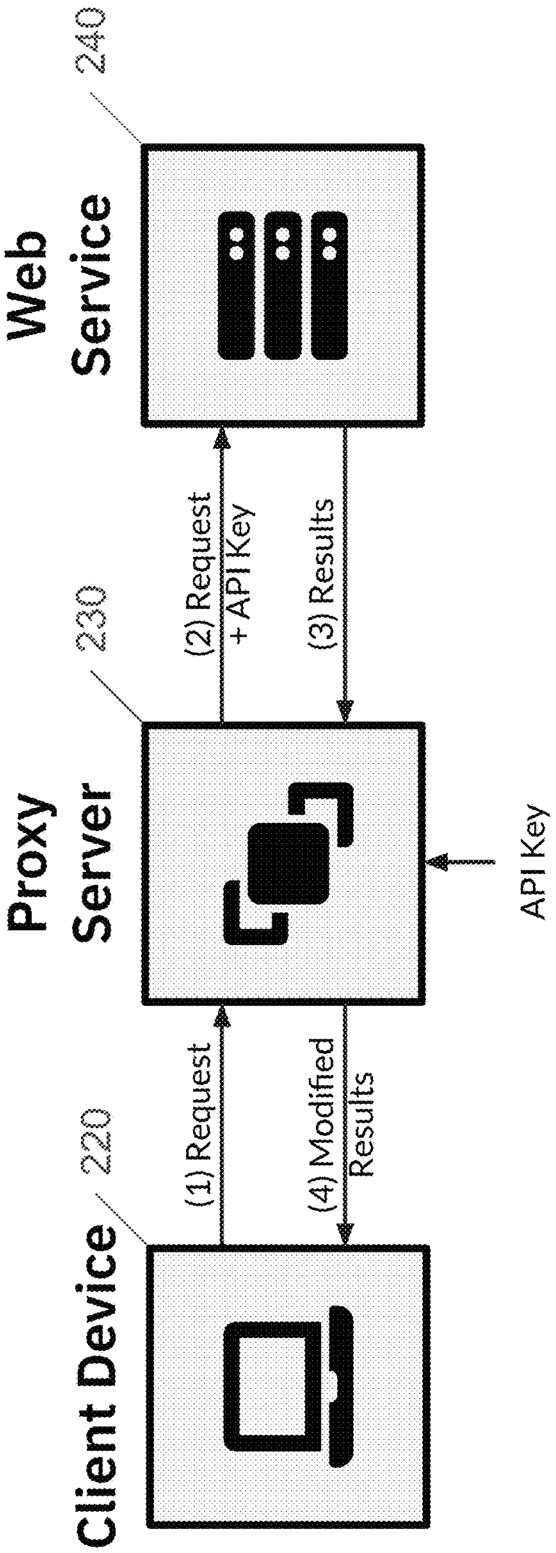
FIG. 35 shows a process of sharing online accounts using a secure system and method for sharing online accounts wherein the proxy server is further configured to modify the API response prior to forwarding them to the client device according to one embodiment of the present disclosure.

In one embodiment, shown in FIG. 33, the proxy server 230 is configured to store an API key associated with an API of the web service 240. In a further embodiment, shown in FIG. 34, the proxy server 230 is configured to allow only certain requests to the API based on their contents. For example, while an API key may permit access to both the "view balance" and "transfer" actions, the proxy server 230 may be configured to only allow the "transfer" action. In another embodiment, shown in FIG. 35, the proxy server 230 is further configured to modify the API response prior to forwarding them to the client device 220. For example, while an API response may contain both the "sales" and "profit" fields, the proxy server 230 may be configured to only include the "sales" field in the modified results forwarded to the client device 220.

The secure system and method for sharing online accounts described herein advantageously improves upon a process of sharing online accounts using direct credential sharing by providing a number of additional desirable security properties. The system and method described herein can provide revocability by preventing browser cookies from being stored on a client device 220. The system and method disclosed herein further can provide complete mediation by ensuring that a credential associated with a shared account 241 is known only to a proxy server 230. The system and method disclosed herein additionally can provide nonrepudiation by requiring requests to be signed and storing signed requests in a tamper-resistant audit log. It further can provide fine-grained permissioning, for example through use of an access control matrix. Therefore, the system and method described herein provides a secure means of sharing access to an online account on a web service 240 lacking native sharing mechanisms.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for sharing online accounts, the system comprising:

a proxy server;

wherein the proxy server is configured to facilitate communication between a client device and a web service to access an API of the web service, wherein the proxy server is configured to access an encrypted API key associated with the API of the web service, wherein the proxy server is configured to reject a request to the API of the web service based on the contents of the request, and wherein the proxy server is configured to modify the response of the web service prior to relaying it to the client device.

2. The system for sharing online accounts of claim 1, wherein the proxy server is further configured to allow only certain requests to the API based on their contents.

3. The system for sharing online accounts of claim 1, wherein the proxy server is further configured to modify an API response prior to forwarding the API response to the client device.

* * * * *